(12) United States Patent
Motegi

(10) Patent No.: US 8,736,239 B2
(45) Date of Patent: May 27, 2014

(54) DC-DC CONVERTER CIRCUIT

(75) Inventor: Shinichi Motegi, Osaka (JP)

(73) Assignee: Yanmar Co., Ltd., Osaka-Shi (JP)

( * ) Notice: Subject to any disclaimer, the term of this patent is extended or adjusted under 35 U.S.C. 154(b) by 256 days.

(21) Appl. No.: 13/386,716

(22) PCT Filed: Jul. 16, 2010

(86) PCT No.: PCT/JP2010/062087
§ 371 (c)(1),
(2), (4) Date: Jan. 24, 2012

(87) PCT Pub. No.: WO2011/013528
PCT Pub. Date: Feb. 3, 2011

(65) Prior Publication Data
US 2012/0126618 A1    May 24, 2012

(30) Foreign Application Priority Data

Jul. 30, 2009  (JP) ................................ 2009-178195
Jul. 30, 2009  (JP) ................................ 2009-178196

(51) Int. Cl.
*H02M 3/158* (2006.01)
(52) U.S. Cl.
USPC ......................................... 323/259; 323/225
(58) Field of Classification Search
CPC .................................................. H02M 3/1582
USPC ........................................ 323/259, 271, 225
See application file for complete search history.

(56) References Cited

U.S. PATENT DOCUMENTS

| 8,111,052 B2 * | 2/2012 | Glovinsky ................... 323/225 |
| 2005/0218876 A1 | 10/2005 | Nino |
| 2008/0278972 A1 | 11/2008 | Kimura |

FOREIGN PATENT DOCUMENTS

| JP | 8-13173 B2 | 12/1987 |
| JP | 2000-295715 A | 10/2000 |
| JP | 2005-295671 A | 10/2005 |
| JP | 2007312459 A * | 11/2007 |
| JP | 2008079352 A * | 4/2008 |
| JP | 2008-283819 A | 11/2008 |

OTHER PUBLICATIONS

International Search Report dated Sep. 28, 2010, issued for PCT/JP2010/062087.

* cited by examiner

*Primary Examiner* — Harry Behm
(74) *Attorney, Agent, or Firm* — Edwards Wildman Palmer LLP; James E. Armstrong, IV; George N. Chaclas

(57) ABSTRACT

There is provided a DC-DC converter circuit with which conduction loss between switching elements is lower than in the conventional art, which affords an increase in power conversion efficiency. A DC-DC converter circuit includes a first switching element including a first semiconductor switch and a first diode, a second switching element including a second semiconductor switch and a second diode, an inductor connected between the cathodes of the first and second diodes, and a third switching element and a fourth switching element provided so as to face in mutually opposite directions on the anode sides of the first and second diodes, wherein a first voltage supply is connected between the cathode side of the first diode and the anode side of the second diode, and a second voltage supply is connected between the anode side of the first diode and the cathode side of the second diode.

14 Claims, 18 Drawing Sheets

(a) First mode (b) Second mode (c) Third mode (a) Fourth mode (b) Fifth mode (c) Sixth mode (a)

(b)

(c)

(d)

(a)

(b)

(c)

(a) First mode (b) Second mode (c) Third mode (a) Fourth mode (b) Fifth mode (c) Sixth mode (a)

(b)

(c)

(d)

(a)

(b)

(c)

(a) First mode (b) Second mode (c) Third mode (a) Fourth mode (b) Fifth mode (c) Sixth mode

DC-DC CONVERTER CIRCUIT

TECHNICAL FIELD

The present invention relates to a DC-DC converter circuit, and more particularly relates to the reduction of conduction loss in a bidirectional buck-boost DC-DC converter circuit.

BACKGROUND ART

A DC-DC converter circuit is connected, for example, between first and second DC voltage supplies (hereinafter referred to simply as first and second voltage supplies), and is used as a bidirectional switching circuit that can supply power from a first voltage supply to a second voltage supply, or supply power from a second voltage supply to a first voltage supply, on the basis of the output voltage of the first and second voltage supplies.

For instance, a DC-DC converter circuit is sometimes used in electric vehicles such as work vehicles. An electric vehicle generally has a motor or other such vehicle electric drive unit that is actuated by AC power obtained by converting DC power from an electric accumulation device such as a battery or a capacitor into AC power with an inverter circuit or other such power conversion circuit. The DC-DC converter circuit is provided between the electric accumulation device serving as a first voltage supply and a second voltage supply to which the inverter circuit or other such power conversion circuit is connected, and is designed so that power is supplied from the electric accumulation device to the power conversion circuit in powering mode, whereas power is supplied from the power conversion circuit to the electric accumulation device in regeneration mode.

An example of a conventional DC-DC converter circuit is the chopper circuit discussed in Patent Document 1 (see FIG. 4 in Patent Document 1).

FIG. 19 is a circuit diagram of an example of a conventional DC-DC converter circuit. The DC-DC converter circuit shown in FIG. 19 includes first to fourth switching elements 121 to 124 and an inductor 125.

The first to fourth switching elements 121 to 124 respectively consist of first to fourth semiconductor switches 121a to 124a that allow current to flow in only one direction, and first to fourth diodes 121b to 124b that are respectively connected in parallel to the first to fourth semiconductor switches 121a to 124a so that the first to fourth diodes 121b to 124b allow current to flow in a reverse direction.

The inductor 125 is connected at one end to both the anode side of the first diode 121b included in the first switching element 121 and the cathode side of the second diode 122b included in the second switching element 122, and at the other end to both the anode side of the third diode 123b included in the third switching element 123 and the cathode side of the second diode 124b included in the fourth switching element 124.

With the DC-DC converter circuit shown in FIG. 19, a first voltage supply 110 is connected between the cathode side of the first diode 121b included in the first switching element 121 and the anode side of the second diode 122b included in the second switching element 122, and a second voltage supply 120 is connected between the cathode side of the third diode 123b included in the third switching element 123 and the anode side of the fourth diode 124b included in the fourth switching element 124.

With this conventional DC-DC converter circuit, examples of operating modes indicating the ON and OFF states of the switching elements 121 to 124 include the following first to third modes in which operation is in powering mode, and the following fourth to sixth modes in which operation is in regeneration mode.

FIG. 20 consists of diagrams of the state when the DC-DC converter circuit shown in FIG. 19 is operating in powering mode. Part (a) of FIG. 20 shows the first mode, part (b) of FIG. 20 shows the second mode, and part (c) of FIG. 20 shows the third mode.

For example, in powering mode, as shown in part (a) of FIG. 20, the first mode is one that forms a current path R1a that goes from the first voltage supply 110, through the first switching element 121, the inductor 125, and the fourth switching element 124, and back to the first voltage supply 110. As shown in part (b) of FIG. 20, the second mode is one that forms a current path R2a that goes from the first voltage supply 110, through the first switching element 121, the inductor 125, the third switching element 123, and the second voltage supply 120, and back to the first voltage supply 110. As shown in part (c) of FIG. 20, the third mode is one that forms a current path R3a that goes from the second voltage supply 120, through the second switching element 122, the inductor 125, and the third switching element 123, and back to the second voltage supply 120.

In powering mode, various switching operations are executed such that at least two modes from among the first mode, second mode, and third mode are switched at a short period (such as one selected from a range of about 10 to 100 kHz), according to the magnitude relation between the output voltage V1 of the first voltage supply 110 and the output voltage V2 of the second voltage supply 120.

FIG. 21 consists of diagrams of the state when the DC-DC converter circuit shown in FIG. 19 is operating in regeneration mode. Part (a) of FIG. 21 shows the fourth mode, part (b) of FIG. 21 shows the fifth mode, and part (c) of FIG. 21 shows the sixth mode.

For example, in regeneration mode, as shown in part (a) of FIG. 21, the fourth mode is one that forms a current path R4a that goes from the first voltage supply 110, through the fourth switching element 124, the inductor 125, and the first switching element 121, and back to the first voltage supply 110. As shown in part (b) of FIG. 21, the fifth mode is one that forms a current path R5a that goes from the first voltage supply 110, through the second voltage supply 120, the third switching element 123, the inductor 125, and the first switching element 121, and back to the first voltage supply 110. As shown in part (c) of FIG. 21, the sixth mode is one that forms a current path R6a that goes from the second voltage supply 120, through the third switching element 123, the inductor 125, and the second switching element 122, and back to the second voltage supply 120.

In regeneration mode, various switching operations are executed such that at least two modes from among the fourth mode, fifth mode, and sixth mod are switched at a short period (such as one selected from a range of about 10 to 100 kHz), according to the magnitude relation between the output voltage V1 of the first voltage supply 110 and the output voltage V2 of the second voltage supply 120.

PRIOR ART DOCUMENT

Patent Document

[Patent Document 1] JP2000-295715A

SUMMARY OF INVENTION

Problems to be Solved by the Invention

With a DC-DC converter circuit, however, as the number of switching elements through which current passes in the various switching modes increases, there is a corresponding rise in conduction loss, and this is accompanied by a drop in power conversion efficiency.

With the conventional DC-DC converter circuit shown in FIG. 19, for example, current passes through the first switching element 121 and the fourth switching element 124 in the first mode (see part (a) of FIG. 20) and the fourth mode (see part (a) of FIG. 21), through the first switching element 121 and the third switching element 123 in the second mode (see part (b) of FIG. 20) and the fifth mode (see part (b) of FIG. 21), and through the second switching element 122 and the third switching element 123 in the third mode (see part (c) of FIG. 20) and the sixth mode (see part (c) of FIG. 21). That is, current passes through at least two switching elements no matter which of the first to sixth modes is in effect (whether in powering mode or regeneration mode), so there is a corresponding rise in conduction loss, and this is accompanied by a drop in power conversion efficiency.

In view of this, it is an object of the present invention to provide a DC-DC converter circuit with which conduction loss in switching elements can be lower than in the conventional art, which affords an increase in power conversion efficiency.

Means for Solving the Problems

In order to solve the above problems, the present invention provides a DC-DC converter circuit comprising a first switching element including a first semiconductor switch with which current can be controlled on and off in one direction, and a first diode connected in parallel to the first semiconductor switch so that the first diode allows current to flow in the opposite direction from the direction of on and off control by the first semiconductor switch; a second switching element including a second semiconductor switch with which current can be controlled on and off in one direction, and a second diode connected in parallel to the second semiconductor switch so that the second diode allows current to flow in the opposite direction from the direction of on and off control by the second semiconductor switch; an inductor connected at one end to the cathode side of the first diode included in the first switching element, and connected at the other end to the cathode side of the second diode included in the second switching element; a third switching element provided so that current can flow in one direction from the anode side of the first diode included in the first switching element to the anode side of the second diode included in the second switching element; and a fourth switching element provided so that current can flow in one direction from the anode side of the second diode included in the second switching element to the anode side of the first diode included in the first switching element, wherein a first voltage supply is connected between the cathode side of the first diode included in the first switching element and the anode side of the second diode included in the second switching element so that the first switching element side of the first voltage supply becomes a positive pole, and a second voltage supply is connected between the anode side of the first diode included in the first switching element and the cathode side of the second diode included in the second switching element so that the second switching element side of the second voltage supply becomes a positive pole.

With the DC-DC converter circuit according to the present invention, the output voltage can be stepped up and down in both directions between the first voltage supply and the second voltage supply. Also, power can be supplied in both directions between the first voltage supply and the second voltage supply. Furthermore, current can be passed through at least one of the switching elements (half the switching elements compared to the conventional art), conduction loss can be correspondingly reduced, and this affords an increase in power conversion efficiency. This effect will be described in detail in the first embodiment below.

As to the module used for the inverter circuit or other such power conversion circuit, there is a commercially available module in which two reverse conducting semiconductor elements are connected in series and integrated (called a 2-in-1 module). With the DC-DC converter circuit according to the present invention, it is sometimes preferable to use this 2-in-1 module, depending on the power capacity and other such design specifications.

From this standpoint, the following embodiments (a) and (b) are embodiments in which it is possible to configure a circuit to which a 2-in-1 module can be applied in the DC-DC converter circuit according to the present invention. Specifically:

(a) In this embodiment, the third switching element includes a third semiconductor switch with which current can be controlled on and off in one direction, a third diode, and a fifth diode; the fourth switching element includes a fourth semiconductor switch with which current can be controlled on and off in one direction, a fourth diode, and a sixth diode; the third diode is connected in parallel to the third semiconductor switch so that the third diode allows current to flow in the opposite direction from the direction of on and off control by the third semiconductor switch; the fourth diode is connected in parallel to the fourth semiconductor switch so that the fourth diode allows current to flow in the opposite direction from the direction of on and off control by the fourth semiconductor switch; the fifth diode is connected between the anode side of the third diode connected in parallel to the third semiconductor switch and the anode side of the second diode included in the second switching element so that the fifth diode allows current to flow in the opposite direction from the third diode; the sixth diode is connected between the anode side of the fourth diode connected in parallel to the fourth semiconductor switch and the anode side of the first diode included in the first switching element so that the sixth diode allows current to flow in the opposite direction from the fourth diode; the cathode side of the third diode connected in parallel to the third semiconductor switch is connected to the anode side of the first diode included in the first switching element; and the cathode side of the fourth diode connected in parallel to the fourth semiconductor switch is connected to the anode side of the second diode included in the second switching element.

(b) In this embodiment, the third switching element includes a third semiconductor switch with which current can be controlled on and off in one direction, and a third diode; the fourth switching element includes a fourth semiconductor switch with which current can be controlled on and off in one direction, and a fourth diode; the third diode is connected in parallel to the fourth semiconductor switch so that the third diode allows current to flow in the opposite direction from the direction of on and off control by the fourth semiconductor switch; the fourth diode is connected in parallel to the third semiconductor switch so that the fourth diode allows current to flow in the opposite direction from the direction of on and off control by the third semiconductor switch; the cathode side of the third diode connected in parallel to the fourth semiconductor switch is connected to the anode side of the second diode included in the second switching element; the cathode side of the fourth diode connected in parallel to the third semiconductor switch is connected to the anode side of the first diode included in the first switching element; and the anode sides of the third diode and the fourth diode are connected.

Examples of the above-mentioned semiconductor switches include an IGBT (insulated gate bipolar transistor), MOSFET (metal-oxide-semiconductor field-effect transistor), GTO (gate turn-off thyristor), and other such semiconductor switches. Examples of the above-mentioned reverse conducting semiconductor elements include a MOSFET or other such semiconductor element having a structurally parasitic diode (or body diode), and an IGBT, GTO, or other such semiconductor element in which diodes are connected in parallel to the semiconductor switch so that the diodes allow current to flow in a reverse direction. Examples include a reverse conducting IGBT element, a reverse conducting MOSFET element, and a reverse conducting GTO element.

A gate drive power supply may be used for each of the various semiconductor switches, but depending on the power capacity and other design specifications, it may be preferable to use a gate drive power supply that is shared with the semiconductor switches to reduce the number of gate drive power supplies.

From this standpoint, the following embodiments (c) and (d) are embodiments in which it is possible to configure a circuit that reduces the number of gate drive power supplies in the DC-DC converter circuit according to the present invention. Specifically:

(c) In this embodiment, the third switching element includes a third semiconductor switch with which current can be controlled on and off in one direction, a third diode, and a fifth diode; the fourth switching element includes a fourth semiconductor switch with which current can be controlled on and off in one direction, a fourth diode, and a sixth diode; the third diode is connected in parallel to the third semiconductor switch so that the third diode allows current to flow in the opposite direction from the direction of on and off control by the third semiconductor switch; the fourth diode is connected in parallel to the fourth semiconductor switch so that the fourth diode allows current to flow in the opposite direction from the direction of on and off control by the fourth semiconductor switch; the fifth diode is connected between the cathode side of the third diode connected in parallel to the third semiconductor switch and the anode side of the first diode included in the first switching element so that the fifth diode allows current to flow in the opposite direction from the third diode; the sixth diode is connected between the cathode side of the fourth diode connected in parallel to the fourth semiconductor switch and the anode side of the second diode included in the second switching element so that the sixth diode allows current to flow in the opposite direction from the fourth diode; the anode side of the third diode connected in parallel to the third semiconductor switch is connected to the anode side of the second diode included in the second switching element; and the anode side of the fourth diode connected in parallel to the fourth semiconductor switch is connected to the anode side of the first diode included in the first switching element.

(d) In this embodiment, the third switching element includes a third semiconductor switch with which current can be controlled on and off in one direction, and a third diode; the fourth switching element includes a fourth semiconductor switch with which current can be controlled on and off in one direction, and a fourth diode; the third diode is connected in parallel to the fourth semiconductor switch so that the third diode allows current to flow in the opposite direction from the direction of on and off control by the fourth semiconductor switch; the fourth diode is connected in parallel to the third semiconductor switch so that the fourth diode allows current to flow in the opposite direction from the direction of on and off control by the third semiconductor switch; the anode side of the third diode connected in parallel to the fourth semiconductor switch is connected to the anode side of the first diode included in the first switching element; the anode side of the fourth diode connected in parallel to the third semiconductor switch is connected to the anode side of the second diode included in the second switching element; and the cathode sides of the third diode and the fourth diode are connected.

Also, from the standpoint of preventing damage to the first to fourth switching elements due to over-current, the following embodiments (e) to (h) are preferable in the DC-DC converter circuit according to the present invention. Specifically:

(e) This embodiment includes means for controlling so that the first switching element and the second switching element are not both in an ON state at the same time.

(f) This embodiment includes means for controlling so that the first switching element and the third switching element are not both in an ON state at the same time.

(g) This embodiment includes means for controlling so that the second switching element and the fourth switching element are not both in an ON state at the same time.

(h) This embodiment is an embodiment of combining two or more of the above embodiments (e) to (g).

The following embodiment (i) is yet another embodiment in the DC-DC converter circuit according to the present invention. Specifically:

(i) In this embodiment, in the connection configuration of both ends of the inductor, connection with the cathode side of the first diode included in the first switching element is replaced by connection with the anode side of the first diode, and connection with the cathode side of the second diode included in the second switching element is replaced by connection with the anode side of the second diode; and in the connection configuration of both ends of the third switching element and in the connection configuration of both ends of the fourth switching element, connection with the anode side of the first diode included in the first switching element is replaced by connection with the cathode side of the first diode, and connection with the anode side of the second diode included in the second switching element is replaced by connection with the cathode side of the second diode.

With the above embodiment (i), the output voltage can be stepped up and down in both directions between the first voltage supply and the second voltage supply. Also, power can be supplied in both directions between the first voltage supply and the second voltage supply. Furthermore, current can be passed through at least one of the switching elements (half the switching elements compared to the conventional art), conduction loss can be correspondingly reduced, and this affords an increase in power conversion efficiency. This effect will be described in detail in the second embodiment below.

As discussed above, a commercially available module in which two reverse conducting semiconductor elements are connected in series and integrated (called a 2-in-1 module) can be used as the module used for the inverter circuit or other such power conversion circuit, and depending on the power capacity and other such design specifications, it may be preferable to use this 2-in-1 module with the DC-DC converter circuit in embodiment (i) above.

From the above standpoint, the following embodiments (j) and (k) are embodiments in which it is possible to configure a circuit to which a 2-in-1 module can be applied in the DC-DC converter circuit in embodiment (i) above. Specifically:

(j) In this embodiment, the third switching element includes a third semiconductor switch with which current can be controlled on and off in one direction, a third diode, and a fifth diode; the fourth switching element includes a fourth semiconductor switch with which current can be controlled on and off in one direction, a fourth diode, and a sixth diode; the third diode is connected in parallel to the third semiconductor switch so that the third diode allows current to flow in the opposite direction from the direction of on and off control by the third semiconductor switch; the fourth diode is connected in parallel to the fourth semiconductor switch so that the fourth diode allows current to flow in the opposite direction from the direction of on and off control by the fourth semiconductor switch; the fifth diode is connected between the cathode side of the third diode connected in parallel to the third semiconductor switch and the cathode side of the first diode included in the first switching element so that the fifth diode allows current to flow in the opposite direction from the third diode; the sixth diode is connected between the cathode side of the fourth diode connected in parallel to the fourth semiconductor switch and the cathode side of the second diode included in the second switching element so that the sixth diode allows current to flow in the opposite direction from the fourth diode; the anode side of the third diode connected in parallel to the third semiconductor switch is connected to the cathode side of the second diode included in the second switching element; and the anode side of the fourth diode connected in parallel to the fourth semiconductor switch is connected to the cathode side of the first diode included in the first switching element.

(k) In this embodiment, the third switching element includes a third semiconductor switch with which current can be controlled on and off in one direction, and a third diode; the fourth switching element includes a fourth semiconductor switch with which current can be controlled on and off in one direction, and a fourth diode; the third diode is connected in parallel to the fourth semiconductor switch so that the third diode allows current to flow in the opposite direction from the direction of on and off control by the fourth semiconductor switch; the fourth diode is connected in parallel to the third semiconductor switch so that the fourth diode allows current to flow in the opposite direction from the direction of on and off control by the third semiconductor switch; the anode side of the third diode connected in parallel to the fourth semiconductor switch is connected to the cathode side of the first diode included in the first switching element; the anode side of the fourth diode connected in parallel to the third semiconductor switch is connected to the cathode side of the second diode included in the second switching element; and the cathode sides of the third diode and the fourth diode are connected.

With the DC-DC converter circuit in embodiment (i) above, one of the following embodiments (l) to (o) may be preferable from the standpoint of preventing damage to the first to fourth switching elements due to over-current. Specifically:

(l) This embodiment includes means for controlling so that the first switching element and the second switching element are not both in an ON state at the same time.

(m) This embodiment includes means for controlling so that the first switching element and the fourth switching element are not both in an ON state at the same time.

(n) This embodiment includes means for controlling so that the second switching element and the third switching element are not both in an ON state at the same time.

(o) This embodiment is an embodiment of combining two or more of the above embodiments (l) to (n).

Effects of the Invention

As described above, the present invention provides a DC-DC converter circuit with which conduction loss in switching elements can be lower than in the conventional art, which affords an increase in power conversion efficiency.

MODES FOR CARRYING OUT THE INVENTION

Embodiments of the present invention will be described with reference to the drawings. The following embodiments are specific examples of the present invention, and are not intended to limit the technical scope of the present invention.

First Embodiment

Figure 1:
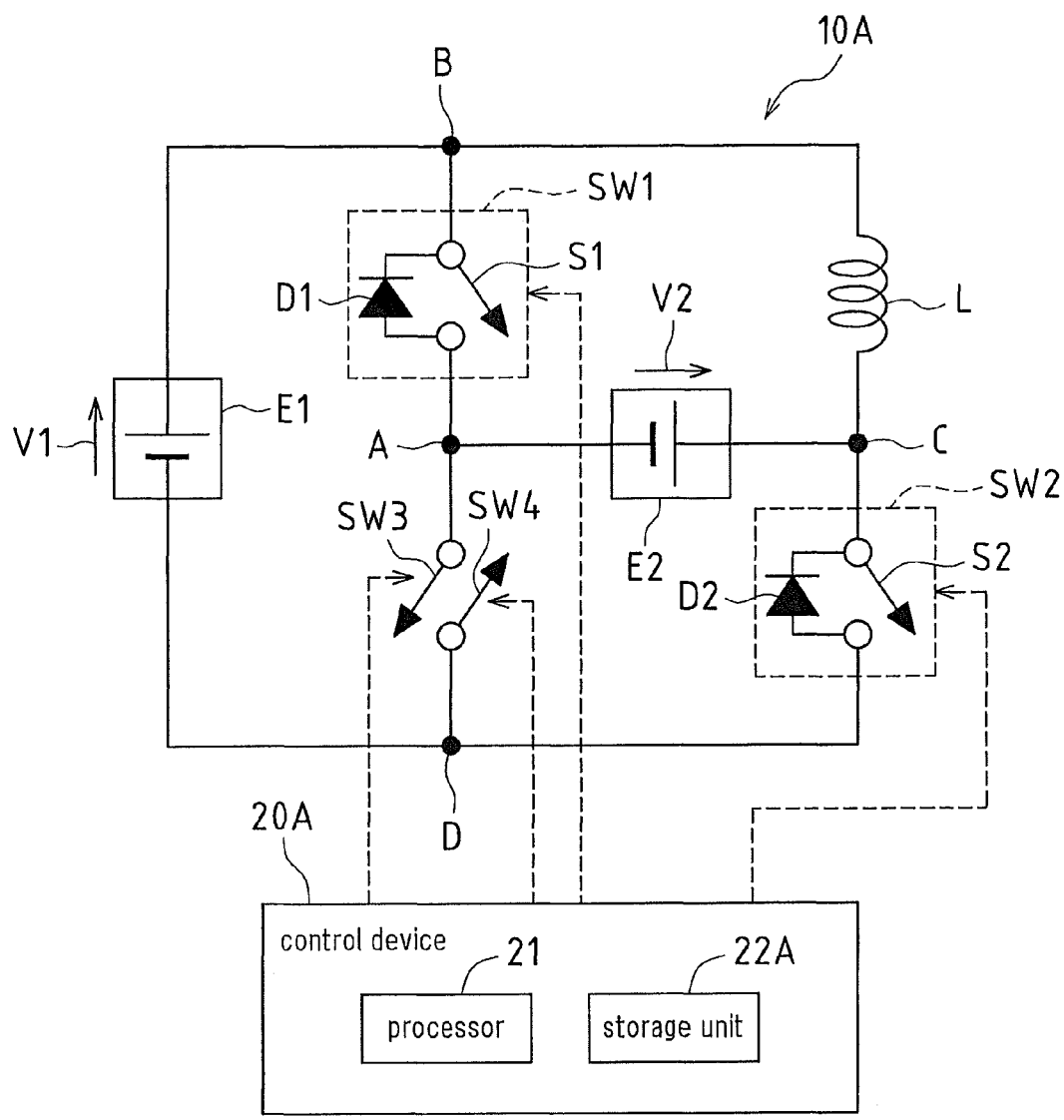
FIG. 1 is a circuit diagram showing a DC-DC converter circuit according to a first embodiment of the present invention.

FIG. 1 is a circuit diagram showing a DC-DC converter circuit 10A according to a first embodiment of the present invention.

The DC-DC converter circuit 10A shown in FIG. 1 includes a first switching element SW1, a second switching element SW2, an inductor L, a third switching element SW3, and a fourth switching element SW4.

The first switching element SW1 is made up of a first semiconductor switch S1 and a first diode D1. The first semiconductor switch S1 is a semiconductor device that controls current on and off in only one direction. The first diode D1 is connected in parallel to the first semiconductor switch S1 so that the first diode D1 allows current to flow in the opposite direction from the direction of on and off control by the first semiconductor switch S1.

The second switching element SW2 is made up of a second semiconductor switch S2 and a second diode D2. The second semiconductor switch S2 is a semiconductor device that controls current on and off in only one direction. The second diode D2 is connected in parallel to the second semiconductor switch S2 so that the second diode D2 allows current to flow in the opposite direction from the direction of on and off control by the second semiconductor switch S2.

The inductor L is connected at one end to the cathode side (see connection point B) of the first diode D1 included in the first switching element SW1, and connected at the other end to the cathode side (see connection point C) of the second diode D2 included in the second switching element SW2.

The third switching element SW3 is configured so that current can flow in only one direction from the anode side of the first diode D1 included in the first switching element SW1 to the anode side of the second diode D2 included in the second switching element SW2.

The fourth switching element SW4 is configured so that current can flow in only one direction from the anode side of the second diode D2 included in the second switching element SW2 to the anode side of the first diode D1 included in the first switching element SW1.

The DC-DC converter circuit 10A has a first voltage supply E1 connected between the cathode side (see connection point B) of the first diode D1 included in the first switching element SW1 and the anode side (see connection point D) of the second diode D2 included in the second switching element SW2 so that the first switching element SW1 side of the first voltage supply E1 becomes a positive pole.

Also, the DC-DC converter circuit 10A has a second voltage supply E2 connected between the anode side (see connection point A) of the first diode D1 included in the first switching element SW1 and the cathode side (see connection point C) of the second diode D2 included in the second switching element SW2 so that the second switching element SW2 side of the second voltage supply E2 becomes a positive pole.

When the DC-DC converter circuit 10A is applied to a work vehicle, for example, the first and second voltage supplies E1 and E2 can be batteries, capacitors, or other such electric accumulation devices. An inverter circuit or other such power conversion circuit can be connected to the first and second voltage supplies E1 and E2 to operate a motor or other such vehicle electric drive unit.

The DC-DC converter circuit 10A according to this first embodiment further includes a control device 20A. The control device 20A includes a processor 21 such as a CPU (central processing unit) and a storage unit 22A. The storage unit 22A includes a ROM (read-only memory), a RAM (random access memory), or other such memory, and is designed to store various control programs, necessary functions and tables, and various data.

The control device 20A is configured to control the switching operation of the first to fourth switching elements SW1 to SW4 of the DC-DC converter circuit 10A.

Examples of the operating modes indicating the ON and OFF states of the first to fourth switching elements SW1 to SW4 in the DC-DC converter circuit 10A according to this first embodiment include the following first to third modes in which operation is in powering mode, and the following fourth to sixth modes in which operation is in regeneration mode.

Figure 2:
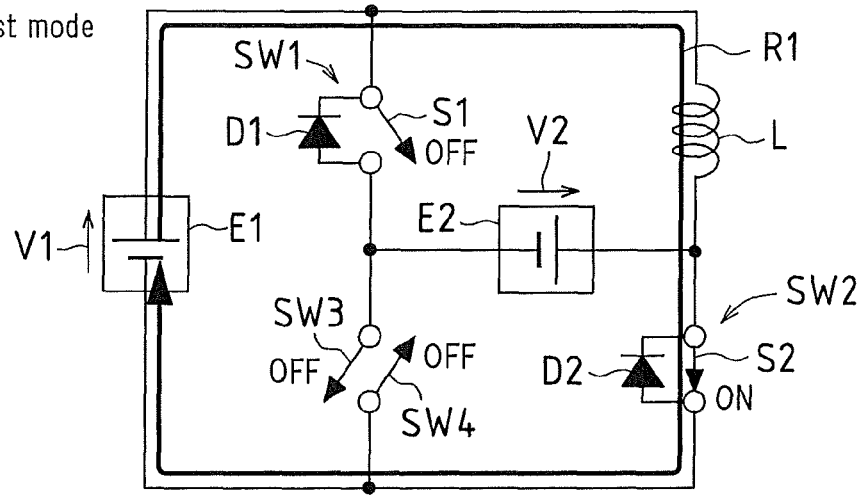
FIG. 2 consists of diagrams showing a state in which the DC-DC converter circuit shown in FIG. 1 is operating in powering mode, with part (a) of FIG. 2 showing the first mode, part (b) of FIG. 2 showing the second mode, and part (c) of FIG. 2 showing the third mode.
Figure 2:
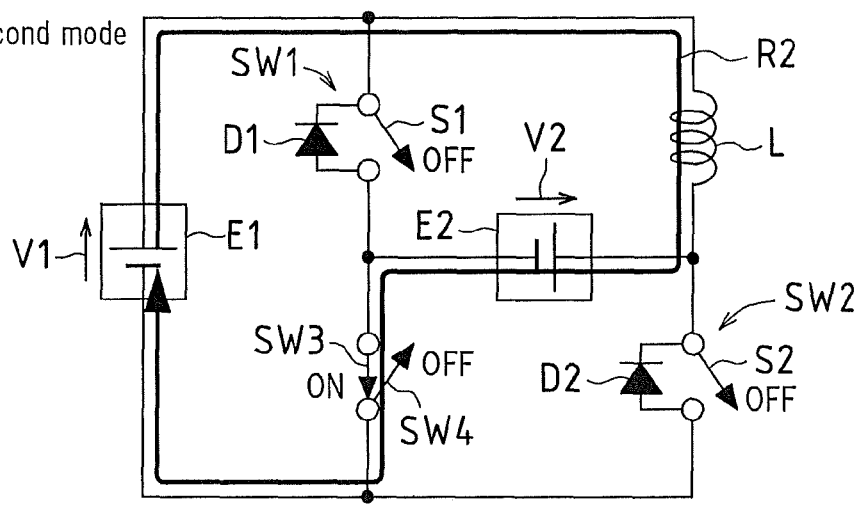
Figure 2:
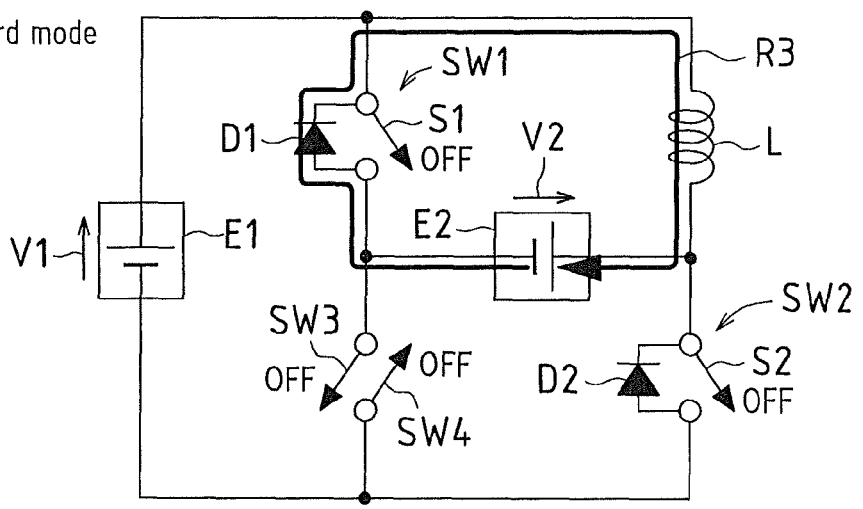

FIG. 2 consists of diagrams showing a state in which the DC-DC converter circuit 10A shown in FIG. 1 is operating in powering mode. Part (a) of FIG. 2 shows the first mode, part (b) of FIG. 2 shows the second mode, and part (c) of FIG. 2 shows the third mode.

Figure 3:
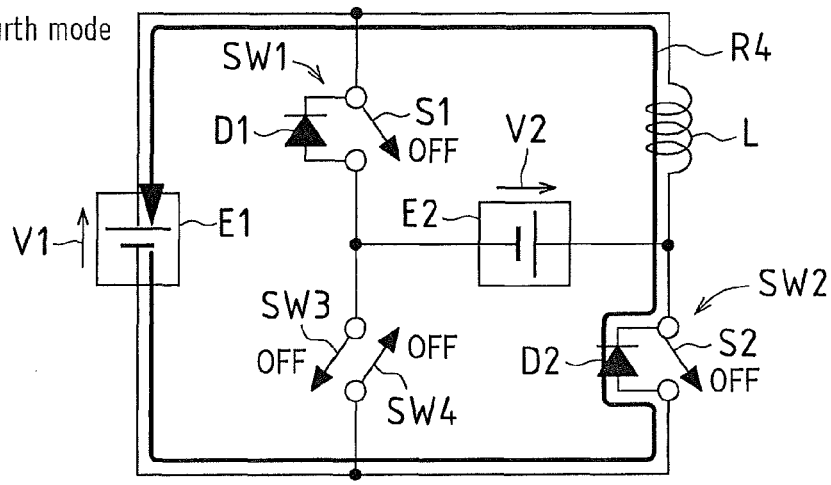
FIG. 3 consists of diagrams showing a state in which the DC-DC converter circuit shown in FIG. 1 is operating in regeneration mode, with part (a) of FIG. 3 showing the fourth mode, part (b) of FIG. 3 showing the fifth mode, and part (c) of FIG. 3 showing the sixth mode.
Figure 3:
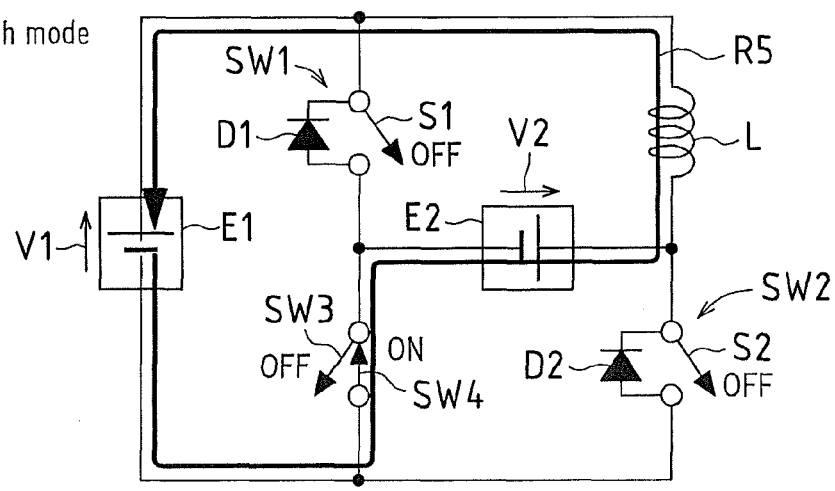
Figure 3:
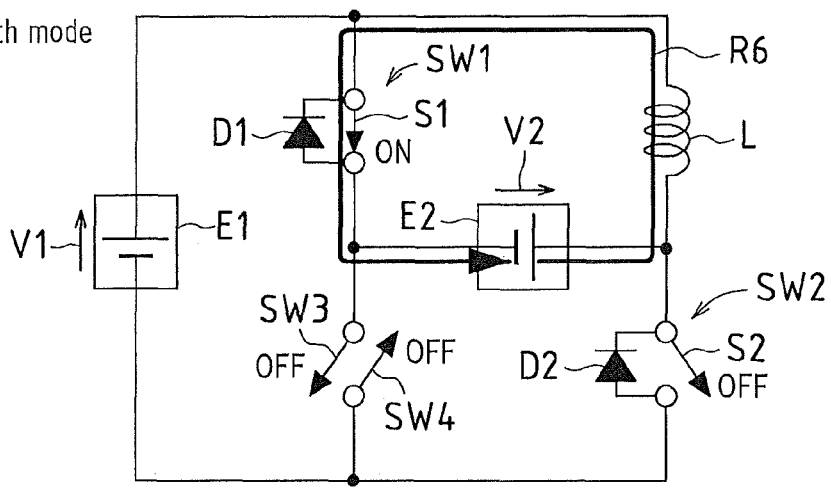

FIG. 3 consists of diagrams showing a state in which the DC-DC converter circuit 10A shown in FIG. 1 is operating in regeneration mode. Part (a) of FIG. 3 shows the fourth mode, part (b) of FIG. 3 shows the fifth mode, and part (c) of FIG. 3 shows the sixth mode.

In powering mode, for example, as shown in part (a) of FIG. 2, the first mode is such that the second switching element SW2 is in its ON state, the first, third, and fourth switching elements SW1, SW3, and SW4 are in their OFF states, and a first current path R1 is formed which goes from the first voltage supply E1, through the inductor L and the second switching element SW2, and back to the first voltage supply E1.

As shown in part (b) of FIG. 2, in the second mode, the third switching element SW3 is in its ON state, the first, second, and fourth switching elements SW1, SW2, and SW4 are in their OFF states, and a second current path R2 is formed which goes from the first voltage supply E1, through the inductor L, the second voltage supply E2, and the third switching element SW3, and back to the first voltage supply E1.

As shown in part (c) of FIG. 2, in the third mode, the first to fourth switching elements SW1 to SW4 are all in their OFF state, and a third current path R3 is formed which goes from the second voltage supply E2, through the first switching element SW1 and the inductor L, and back to the second voltage supply E2.

In powering mode, various switching operations can be executed such that at least two modes from among the first mode, second mode, and third mode are switched at a short period (such as one selected from a range of about 10 to 100 kHz), according to the magnitude relation between the output voltage V1 of the first voltage supply E1 and the output voltage V2 of the second voltage supply E2.

More specifically, when the output voltage V1 of the first voltage supply E1 is greater than the output voltage V2 of the second voltage supply E2, a switching operation that switches between the second mode and the third mode can be executed, for example, and when the output voltage V1 of the first voltage supply E1 is less than the output voltage V2 of the second voltage supply E2, a switching operation that switches between the first mode and the second mode can be executed, for example. When the output voltage V1 of the first voltage supply E1 and the output voltage V2 of the second voltage supply E2 are equal, a switching operation that switches between the first mode and the third mode can be executed, for example, or only the second mode can be executed. Further, when the output voltage V1 of the first voltage supply E1 and the output voltage V2 of the second voltage supply E2 are substantially equal (when the absolute value of the difference between the voltage V1 and the voltage V2 is within a specific range), a switching operation that switches between the first mode and the third mode can be executed, or only the second mode can be executed.

In regeneration mode, as shown in part (a) of FIG. 3, for example, the fourth mode can be one in which the first to fourth switching elements SW1 to SW4 are all in their OFF state, and a fourth current path R4 is formed which goes from the first voltage supply E1, through the second switching element SW2 and the inductor L, and back to the first voltage supply E1.

As shown in part (b) of FIG. 3, the fifth mode can be one in which the fourth switching element SW4 is in its ON state, the first, second, and third switching elements SW1, SW2, and SW3 are in their OFF state, and a fifth current path R5 is formed which goes from the first voltage supply E1, through the fourth switching element SW4, the second voltage supply E2, and the inductor L, and back to the first voltage supply E1.

As shown in part (c) of FIG. 3, the sixth mode can be one in which the first switching element SW1 is in its ON state, the second, third, and fourth switching elements SW2, SW3, and SW4 are in their OFF states, and a sixth current path R6 is formed which goes from the second voltage supply E2, through the inductor L and the first switching element SW1, and back to the second voltage supply E2.

In regeneration mode, various switching operations can be executed such that at least two modes from among the fourth mode, fifth mode, and sixth mode are switched at a short period (such as one selected from a range of about 10 to 100 kHz), according to the magnitude relation between the output voltage V1 of the first voltage supply E1 and the output voltage V2 of the second voltage supply E2.

More specifically, when the output voltage V1 of the first voltage supply E1 is greater than the output voltage V2 of the second voltage supply E2, a switching operation that switches between the fifth mode and the sixth mode can be executed, for example, and when the output voltage V1 of the first voltage supply E1 is less than the output voltage V2 of the second voltage supply E2, a switching operation that switches between the fourth mode and the fifth mode can be executed, for example. When the output voltage V1 of the first voltage supply E1 and the output voltage V2 of the second voltage supply E2 are equal, a switching operation that switches between the fourth mode and the sixth mode can be executed, for example, or only the fifth mode can be executed. Further, when the output voltage V1 of the first voltage supply E1 and the output voltage V2 of the second voltage supply E2 are substantially equal (when the absolute value of the difference between the voltage V1 and the voltage V2 is within a specific range), a switching operation that switches between the fourth mode and the sixth mode can be executed, or only the fifth mode can be executed.

The output voltage V1 of the first voltage supply E1 and the output voltage V2 of the second voltage supply E2 can be measured with a voltage meter (not shown).

As described above, with the DC-DC converter circuit 10A according to the first embodiment of the present invention, the output voltages V1 and V2 can be stepped up and down in both directions between the first voltage supply E1 and the second voltage supply E2. Also, power can be supplied in both directions between the first voltage supply E1 and the second voltage supply E2. Furthermore, current only needs to pass through the second switching element SW2 in the first mode (see part (a) of FIG. 2) and the fourth mode (see part (a) of FIG. 3), through the third switching element SW3 in the second mode (see part (b) of FIG. 2), through the fourth switching element SW4 in the fifth mode (see part (b) of FIG. 3), and through the first switching element SW1 in the third mode (see part (c) of FIG. 2) and the sixth mode (see part (c) of FIG. 3). In other words, in any mode, from the first to the sixth (whether in powering mode or regeneration mode), current can be passed through at least one of the switching elements (half the switching elements compared to the conventional art), conduction loss can be correspondingly reduced, and this affords an increase in power conversion efficiency.

In particular, the shorter is the switching period of each mode, the greater is the switching loss with the first to fourth switching elements SW1 to SW4, so the above-mentioned effect is correspondingly greater.

An IGBT, MOSFET, or GTO are examples that can be used as semiconductor switches in the first to fourth switching elements SW1 to SW4. A MOSFET is usually used with systems of about 200 V or less, and an IGBT with about 2 kV or less. Also, when a MOSFET is used for the first to fourth switching elements SW1 to SW4, conduction loss with this MOSFET can be reduced by synchronous rectification in which the MOSFET is switched ON when current is flowing to a back-to-back connected diode.

Figure 4:
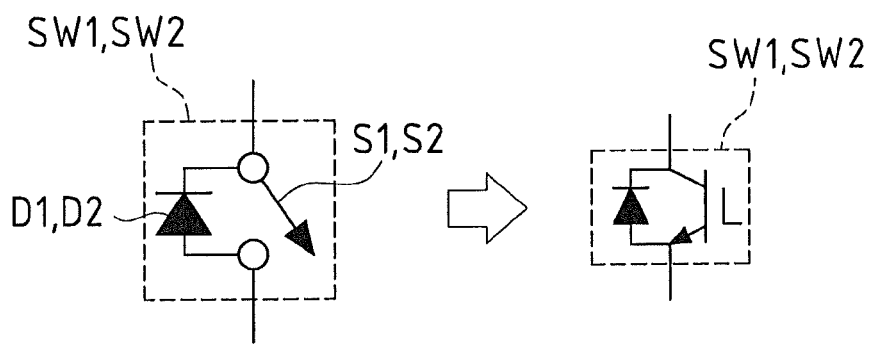
FIG. 4 consists of diagrams showing examples of semiconductor switches that can be used for the first to fourth switching elements in the DC-DC converter circuit shown in FIG. 1, with part (a) of FIG. 4 showing an example in which a reverse conducting IGBT element is used as the first and second switching elements, part (b) of FIG. 4 showing an example in which the connection configuration between the third switching element and the fourth switching element is made up of only a reverse-blocking IGBT element, part (c) of FIG. 4 showing an example in which the connection configuration between the third switching element and the fourth switching element is made up of a reverse conducting IGBT and a diode, and part (d) of FIG. 4 showing an example in which the connection configuration between the third switching element and the fourth switching element is made up of a reverse conducting IGBT.
Figure 4:
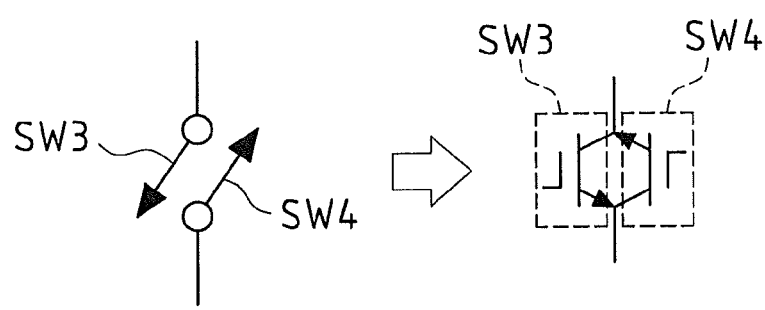
Figure 4:
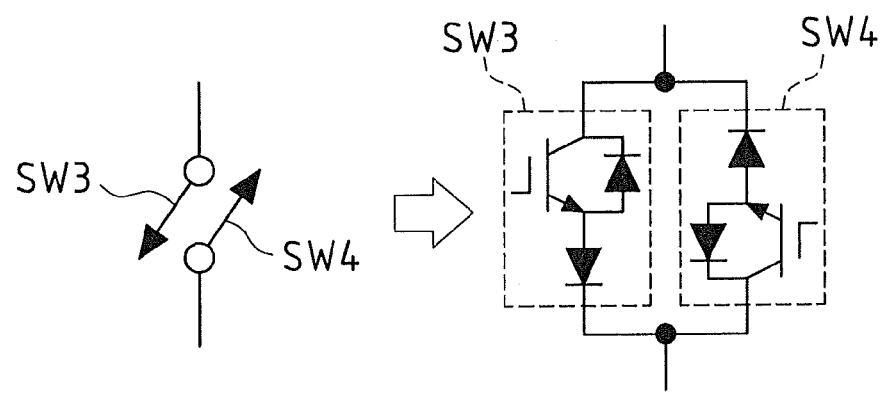
Figure 4:
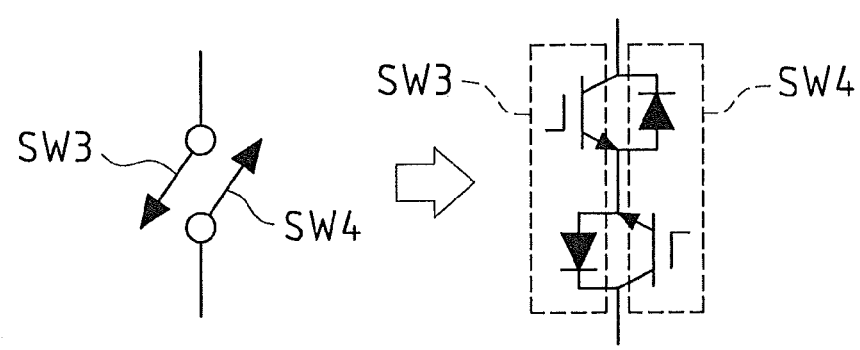

FIG. 4 consists of diagrams showing examples of semiconductor switches that can be used for the first to fourth switching elements SW1 to SW4 in the DC-DC converter circuit 10A shown in FIG. 1. Part (a) of FIG. 4 shows an example (on the right side in the drawing) in which a reverse conducting IGBT element is used as the first and second switching elements SW1 and SW2. Part (b) of FIG. 4 shows an example (on the right side in the drawing) in which the connection configuration between the third switching element SW3 and the fourth switching element SW4 is made up of only a reverse-blocking IGBT. Part (c) of FIG. 4 shows an example (on the right side in the drawing) in which the connection configuration between the third switching element SW3 and the fourth switching element SW4 is made up of a reverse conducting IGBT and a diode. Part (d) of FIG. 4 shows an example (on the right side in the drawing) in which the connection configuration between the third switching element SW3 and the fourth switching element SW4 is made up of a reverse conducting IGBT. The connection examples shown in parts (c) and (d) of FIG. 4 will be described below in the first and fourth examples.

In the example shown in FIG. 4, the semiconductor switch is an IGBT, but the semiconductor switch may instead be a MOSFET or a GTO.

The first to fourth switching elements SW1 to SW4 can also be a 2-in-1 module in which two reverse conducting semiconductor elements are connected in series and integrated.

Figure 5:
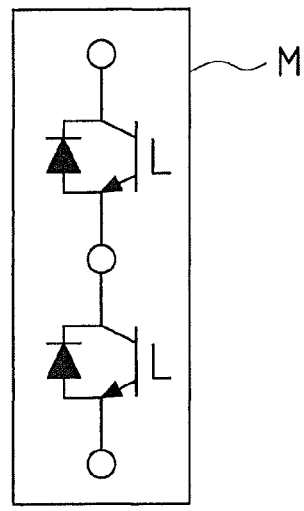
FIG. 5 is a diagram of an example of a 2-in-1 module that can be used for the first to fourth switching elements in the DC-DC converter circuit shown in FIG. 1.

FIG. 5 is a diagram of an example of a 2-in-1 module that can be used for the first to fourth switching elements SW1 to SW4 in the DC-DC converter circuit 10A shown in FIG. 1. In the example shown in FIG. 5, the 2-in-1 module is constituted by reverse conducting IGBT elements. This is not the only option, however, and the 2-in-1 module may instead be constituted by reverse conducting MOSFET elements, or reverse conducting GTO elements.

The following first and second examples can be given as examples that can constitute a circuit to which a 2-in-1 module can be applied with the DC-DC converter circuit 10A.

First Example

Figure 6:
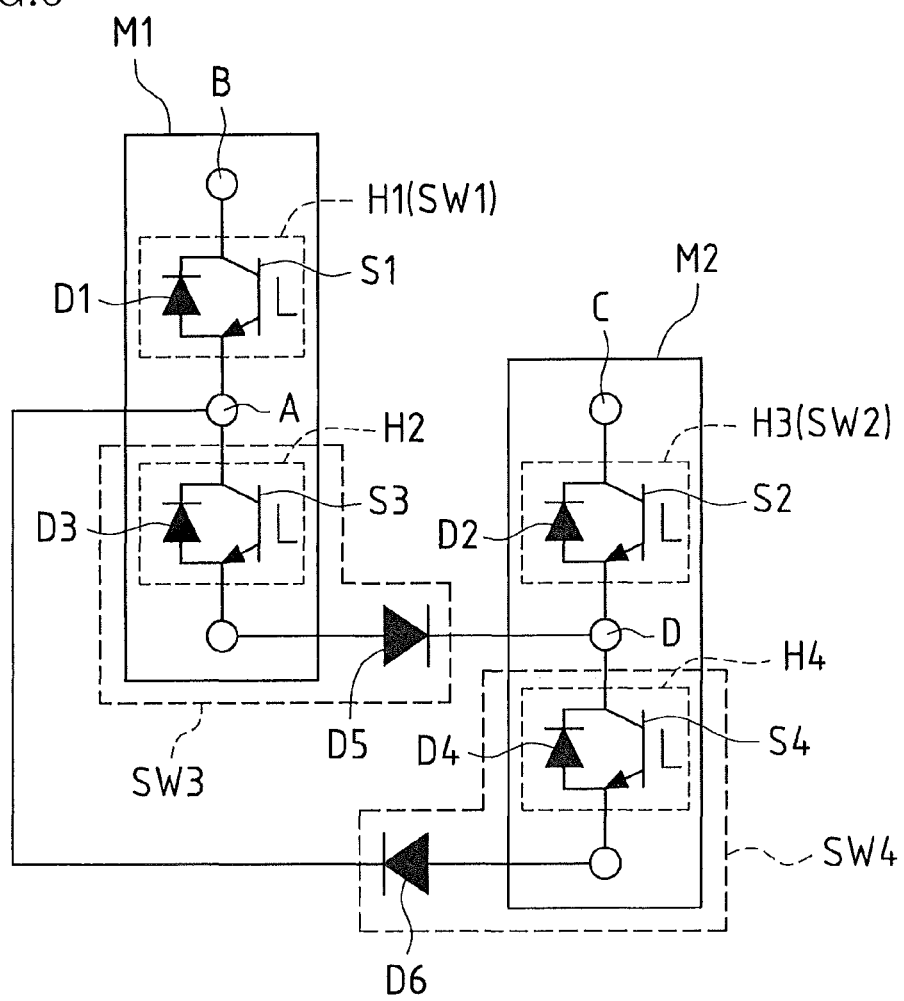
FIG. 6 is a circuit diagram of a first example that can constitute a circuit to which a 2-in-1 module can be applied in the DC-DC converter circuit shown in FIG. 1.

FIG. 6 is a circuit diagram of a first example that can constitute a circuit to which a 2-in-1 module can be applied in the DC-DC converter circuit shown in FIG. 1. The connection points A to D shown in FIG. 6 correspond to the respective connection points A to D shown in FIG. 1. Also, the voltage supply and so forth are not shown in FIG. 6. The same holds true for the circuits in FIGS. 7 to 9 discussed below.

As shown in FIG. 6, in the first example, the third switching element SW3 is made up of a third semiconductor switch S3 with which current can be controlled on and off in only one direction, a third diode D3, and a fifth diode D5.

The fourth switching element SW4 is made up of a fourth semiconductor switch S4 with which current can be controlled on and off in only one direction, a fourth diode D4, and a sixth diode D6.

The third diode D3 is connected in parallel to the third semiconductor switch S3 so that the third diode D3 allows current to flow in the opposite direction from the direction of on and off control by the third semiconductor switch S3.

The fourth diode D4 is connected in parallel to the fourth semiconductor switch S4 so that the fourth diode D4 allows current to flow in the opposite direction from the direction of on and off control by the fourth semiconductor switch S4.

The fifth diode D5 is connected between the anode side of the third diode D3 connected in parallel to the third semiconductor switch S3 and the anode side (see connection point D) of the second diode D2 included in the second switching element SW2 so that the fifth diode D5 allows current to flow in the opposite direction from the third diode D3.

The sixth diode D6 is connected between the anode side of the fourth diode D4 connected in parallel to the fourth semiconductor switch S4 and the anode side (see connection point A) of the first diode D1 included in the first switching element SW1 so that the sixth diode D6 allows current to flow in the opposite direction from the fourth diode D4.

The cathode side of the third diode D3 connected in parallel to the third semiconductor switch S3 is connected to the anode side (see connection point A) of the first diode D1 included in the first switching element SW1. The cathode side of the fourth diode D4 connected in parallel to the fourth semiconductor switch S4 is connected to the anode side (see connection point D) of the second diode D2 included in the second switching element SW2.

In this first example, the semiconductor element (first switching element SW1) composed of the first semiconductor switch S1 and the first diode D1 can serve as a first reverse conducting semiconductor element H1 of the upper arm, and the semiconductor element composed of the third semiconductor switch S3 and the third diode D3 can serve as a second reverse conducting semiconductor element H2 of the lower arm.

Consequently, with the DC-DC converter circuit 10A, the first reverse conducting semiconductor element H1 and the second reverse conducting semiconductor element H2 can be connected in series and integrated for use as a 2-in-1 module M1.

Also, the semiconductor element (second switching element SW2) composed of the second semiconductor switch S2 and the second diode D2 can serve as a third reverse conducting semiconductor element H3 of the upper arm, and the semiconductor element composed of the fourth semiconductor switch S4 and the fourth diode D4 can serve as a fourth reverse conducting semiconductor element H4 of the lower arm.

Consequently, with the DC-DC converter circuit 10A, the third reverse conducting semiconductor element H3 and the fourth reverse conducting semiconductor element 114 can be connected in series and integrated for use as a 2-in-1 module M2.

Since the 2-in-1 modules M1 and M2 can thus be used, a circuit configuration that is more convenient to use can be realized.

Second Example

Figure 7:
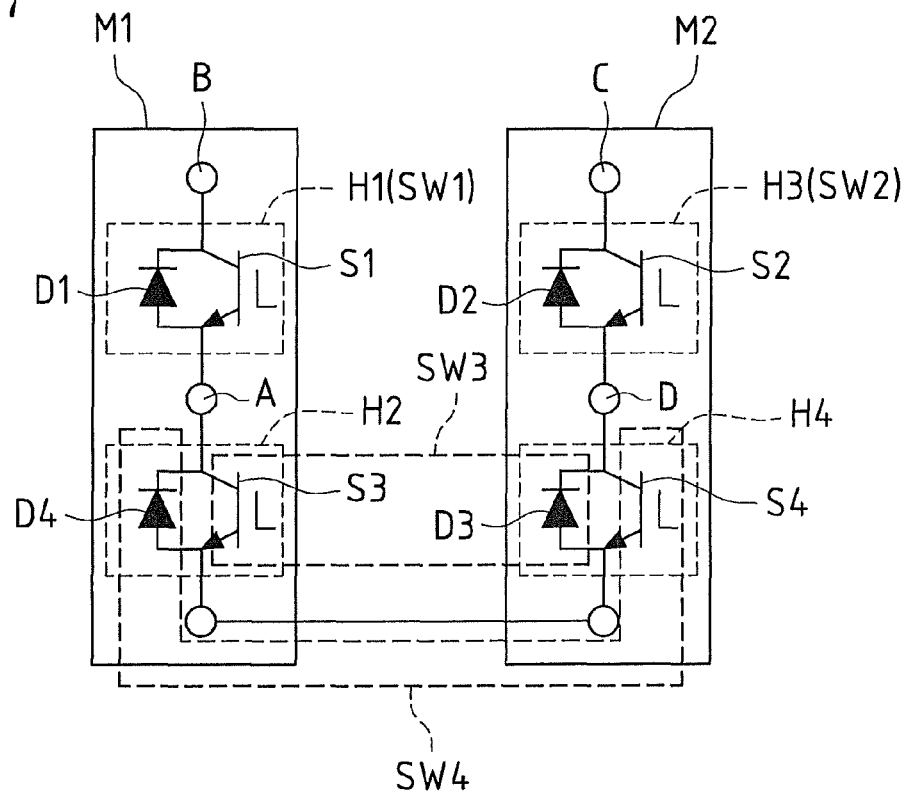
FIG. 7 is a circuit diagram of a second example that can constitute a circuit to which a 2-in-1 module can be applied in the DC-DC converter circuit shown in FIG. 1.

FIG. 7 is a circuit diagram of a second example that can constitute a circuit to which a 2-in-1 module can be applied in the DC-DC converter circuit shown in FIG. 1.

As shown in FIG. 7, in the second example the third switching element SW3 is made up of a third semiconductor switch S3 with which current can be controlled on and off in only one direction, and a third diode D3.

The fourth switching element SW4 is made up of a fourth semiconductor switch S4 with which current can be controlled on and off in only one direction, and a fourth diode D4.

The third diode D3 is connected in parallel to the fourth semiconductor switch S4 so that the third diode D3 allows current to flow in the opposite direction from the direction of on and off control by the fourth semiconductor switch S4.

The fourth diode D4 is connected in parallel to the third semiconductor switch S3 so that the fourth diode D4 allows current to flow in the opposite direction from the direction of on and off control by the third semiconductor switch S3.

The cathode side of the third diode D3 connected in parallel to the fourth semiconductor switch S4 is connected to the anode side (see connection point D) of the second diode D2 included in the second switching element SW3. The cathode side of the fourth diode D4 connected in parallel to the third semiconductor switch S3 is connected to the anode side (see connection point A) of the first diode D1 included in the first switching element SW1. Also, the anode sides of the third diode D3 and the fourth diode D4 are connected.

In this second example, the semiconductor element (first switching element SW1) composed of the first semiconductor switch S1 and the first diode D1 can serve as a first reverse conducting semiconductor element H1 of the upper arm, and the semiconductor element composed of the third semiconductor switch S3 and the fourth diode D4 can serve as a second reverse conducting semiconductor element H2 of the lower arm.

Consequently, with the DC-DC converter circuit 10A, the first reverse conducting semiconductor element H1 and the second reverse conducting semiconductor element H2 can be connected in series and integrated for use as a 2-in-1 module M1.

Also, the semiconductor element (second switching element SW2) composed of the second semiconductor switch S2 and the second diode D2 can serve as a third reverse conducting semiconductor element H3 of the upper arm, and the semiconductor element composed of the fourth semiconductor switch S4 and the third diode D3 can serve as a fourth reverse conducting semiconductor element H4 of the lower arm.

Consequently, with the DC-DC converter circuit 10A, the third reverse conducting semiconductor element H3 and the fourth reverse conducting semiconductor element H4 can be connected in series and integrated for use as a 2-in-1 module M2.

Since the 2-in-1 modules M1 and M2 can thus be used, a circuit configuration that is more convenient to use can be realized.

Furthermore, since, unlike in the first example, there is no need to provide the fifth diode D5 and the sixth diode D6, the circuit configuration can be that much simpler.

With the circuit configuration in the first example, as shown in FIG. 6, each of anodes of the first to fourth diodes D1 to D4 cannot be shared with any of the first to fourth diodes D1 to D4. For example, when the first to fourth semiconductor switches S1 to S4 are IGBTs, each of emitters of the IGBTs cannot be shared with any of the IGBTs. Also, when the first to fourth semiconductor switches S1 to S4 are MOSFETs, each of emitters of the MOSFETs cannot be shared with any of the MOSFETs. In addition, when the first to fourth semiconductor switches S1 to S4 are GTOs, each of cathodes of the GTOs cannot be shared with any of the GTOs.

Accordingly, a gate drive power supply (not shown) has to be provided to each of the first to fourth semiconductor switches S1 to S4, that is, a total of four gate drive power supplies are needed.

Also, as shown in FIG. 7, with the circuit configuration of the second example, each of anodes of the first and second diodes D1 and D2 cannot be shared with any of the first to fourth diodes D1 to D4. For example, when the first and second semiconductor switches S1 and S2 are IGBTs, each of emitters of the IGBTs cannot be shared with any of the IGBTs. In addition, when the first and second semiconductor switches S1 and S2 are MOSFETs, each of sources of the MOSFETs cannot be shared with any of the MOSFETs. Also, when the first and second semiconductor switches S1 and S2 are GTOs, each of cathodes of the GTOs cannot be shared with any of the GTOs.

Accordingly, a gate drive power supply (not shown) has to be provided to each of the first and second semiconductor switches S1 and S2 and one gate drive power supply has to be shared with the third and fourth semiconductor switches S3 and S4, that is, a total of three gate drive power supplies are needed.

From this standpoint, the following third and fourth examples can be given as examples that can constitute a circuit with which the number of gate drive power supplies can be reduced with the DC-DC converter circuit 10A.

Third Example

Figure 8:
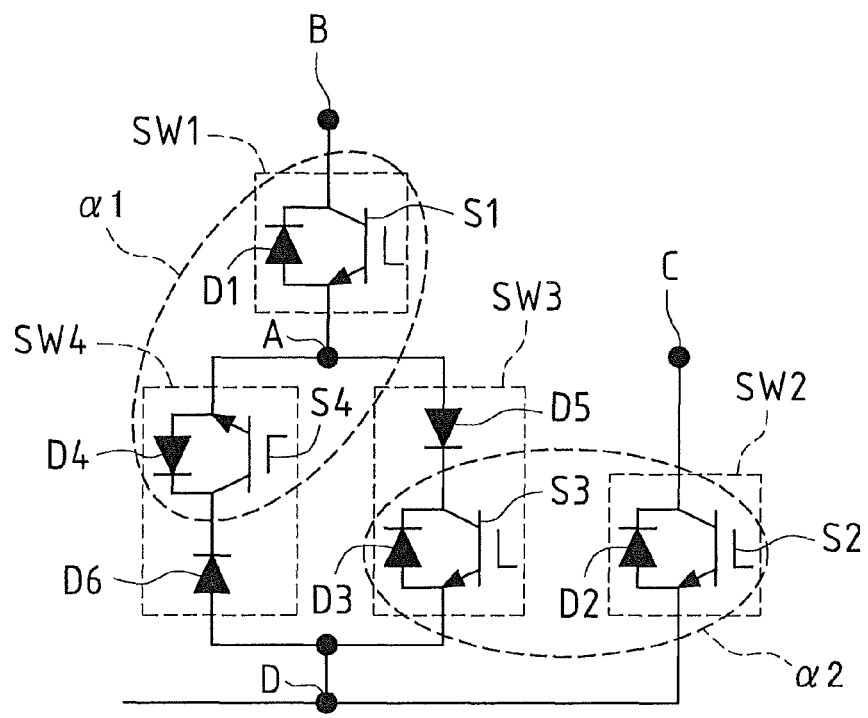
FIG. 8 is a circuit diagram of a third example that can constitute a circuit which can reduce the number of gate drive power supplies in the DC-DC converter circuit shown in FIG. 1.

FIG. 8 is a circuit diagram of a third example that can constitute a circuit which can reduce the number of gate drive power supplies in the DC-DC converter circuit shown in FIG. 1.

With this third example, as shown in FIG. 8, the third switching element SW3 is made up of a third semiconductor switch S3 with which current can be controlled on and off in only one direction, a third diode D3, and a fifth diode D5.

The fourth switching element SW4 is made up of a fourth semiconductor switch S4 with which current can be controlled on and off in only one direction, a fourth diode D4, and a sixth diode D6.

The third diode D3 is connected in parallel to the third semiconductor switch S3 so that the third diode D3 allows current to flow in the opposite direction from the direction of on and off control by the third semiconductor switch S3.

The fourth diode D4 is connected in parallel to the fourth semiconductor switch S4 so that the fourth diode D4 allows current to flow in the opposite direction from the direction of on and off control by the fourth semiconductor switch S4.

The fifth diode D5 is connected between the cathode side of the third diode D3 connected in parallel to the third semiconductor switch S3 and the anode side (see connection point A) of the first diode D1 included in the first switching element SW1 so that the fifth diode D5 allows current to flow in the opposite direction from the third diode D3.

The sixth diode D6 is connected between the cathode side of the fourth diode D4 connected in parallel to the fourth semiconductor switch S4 and the anode side (see connection point D) of the second diode D2 included in the second switching element SW2 so that the sixth diode D6 allows current to flow in the opposite direction from the fourth diode D4.

The anode side of the third diode D3 connected in parallel to the third semiconductor switch S3 is connected to the anode side (see connection point D) of the second diode D2 included in the second switching element SW2. The anode side of the fourth diode D4 connected in parallel to the fourth semiconductor switch S4 is connected to the anode side (see connection point A) of the first diode D1 included in the first switching element SW1.

In this third example, the anode side of the first diode D1 and the anode side of the fourth diode D4 are connected, so an anode can be shared with the first diode D1 and the fourth diode D4 (see the broken line portion α1).

Also, the anode side of the second diode D2 and the anode side of the third diode D3 are connected, so an anode can be shared with the second diode D2 and the third diode D3 (see the broken line portion α2).

Consequently, with the DC-DC converter circuit 10A, the same (shared) gate drive power supply (not shown) can be used for both the first semiconductor switch S1 and the fourth semiconductor switch S4. Also, the same (shared) gate drive power supply (not shown) can be used for both the second semiconductor switch S2 and the third semiconductor switch S3. Therefore, a total of only two gate drive power supplies are needed.

Fourth Example

Figure 9:
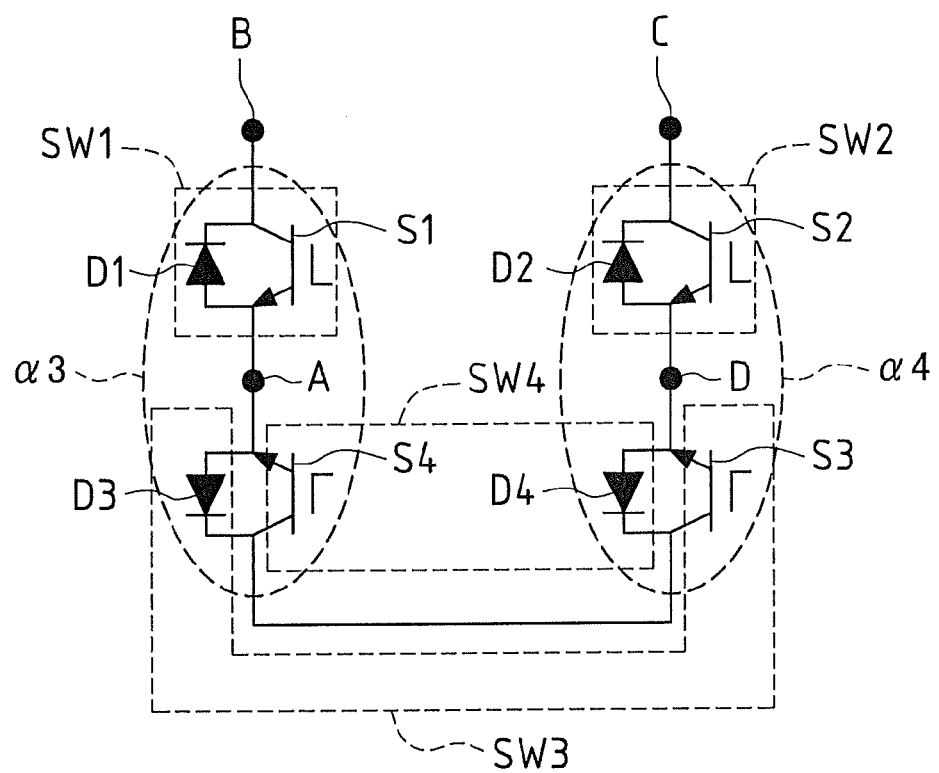
FIG. 9 is a circuit diagram of a fourth example that can constitute a circuit which can reduce the number of gate drive power supplies in the DC-DC converter circuit shown in FIG. 1.

FIG. 9 is a circuit diagram of a fourth example that can constitute a circuit which can reduce the number of gate drive power supplies in the DC-DC converter circuit 10A shown in FIG. 1.

In this fourth example, as shown in FIG. 9, the third switching element SW3 is made up of a third semiconductor switch S3 with which current can be controlled on and off in only one direction, and a third diode D3.

The fourth switching element SW4 is made up of a fourth semiconductor switch S4 with which current can be controlled on and off in only one direction, and a fourth diode D4.

The third diode D3 is connected in parallel to the fourth semiconductor switch S4 so that the third diode D3 allows current to flow in the opposite direction from the direction of on and off control by the fourth semiconductor switch S4.

The fourth diode D4 is connected in parallel to the third semiconductor switch S3 so that the fourth diode D4 allows current to flow in the opposite direction from the direction of on and off control by the third semiconductor switch S3.

The anode side of the third diode D3 connected in parallel to the fourth semiconductor switch S4 is connected to the anode side (see connection point A) of the first diode D1 included in the first switching element SW1. The anode side of the fourth diode D4 connected in parallel to the third semiconductor switch S3 is connected to the anode side (see connection point D) of the second diode D2 included in the second switching element SW2. Also, the cathode sides of the third diode D3 and the fourth diode D4 are connected.

In this fourth example, anode side of the first diode D1 and the anode side of the third diode D3 are connected, so an anode can be shared with the first diode D1 and the third diode D3 (see the broken line portion aα).

Also, the anode side of the second diode D2 and the anode side of the fourth diode D4 are connected, so an anode can be shared with the second diode D2 and the fourth diode D4 (see the broken line portion α4).

Consequently, with the DC-DC converter circuit 10A, the same (shared) gate drive power supply (not shown) can be used for both the first semiconductor switch S1 and the fourth semiconductor switch S4. Also, the same (shared) gate drive power supply (not shown) can be used for both the second semiconductor switch S2 and the third semiconductor switch S3. Therefore, a total of only two gate drive power supplies are needed.

Next, control examples by the control device 20A of the first to fourth switching elements SW1 to SW4 will be described.

In this first embodiment, the DC-DC converter circuit 10A includes a protection function that performs a control example of the following switching operation with the control device 20A, for the purpose of preventing damage to the first to fourth switching elements SW1 to SW4 due to over-current.

Figure 10:
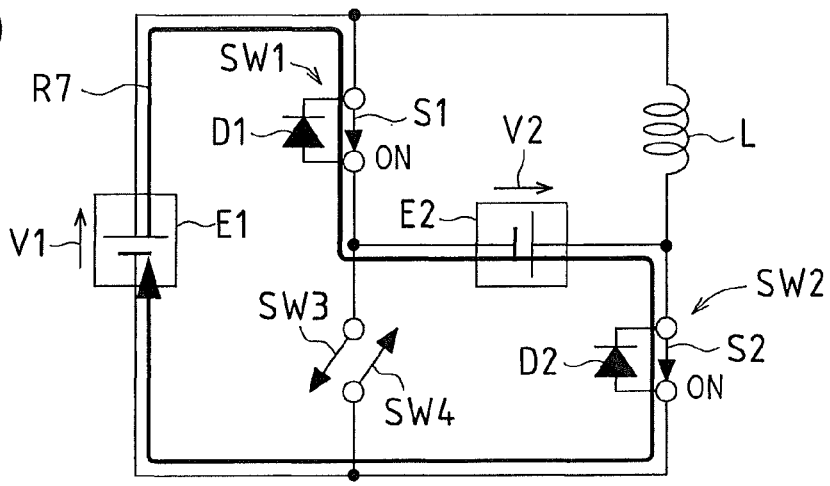
FIG. 10 consists of diagrams showing seventh to ninth current paths that are prohibited by first to third control examples of the switching operation of the first to fourth switching elements in the DC-DC converter circuit shown in FIG. 1, with part (a) of FIG. 10 showing the seventh current path, part (b) of FIG. 10 showing the eighth current path, and part (c) of FIG. 10 showing the ninth current path.
Figure 10:
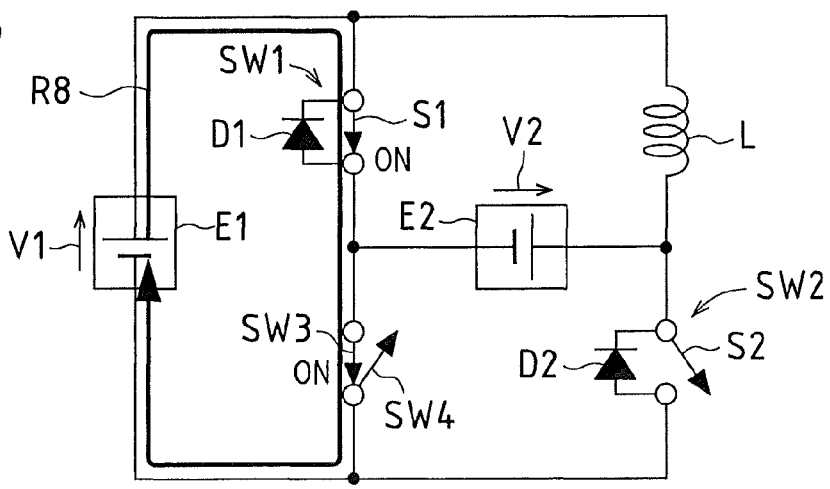
Figure 10:
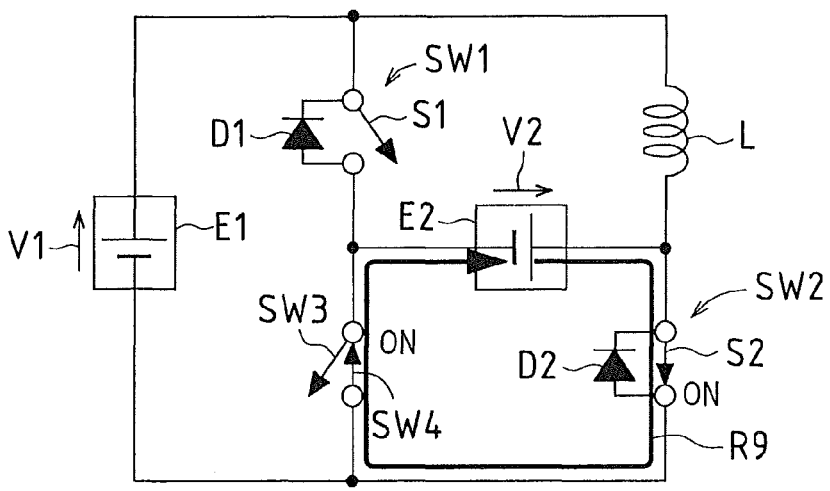

FIG. 10 consists of diagrams showing seventh to ninth current paths R7 to R9 that are prohibited by first to third control examples of the switching operation of the first to fourth switching elements SW1 to SW4 in the DC-DC converter circuit 10A shown in FIG. 1. Part (a) of FIG. 10 shows the seventh current path R7, part (b) of FIG. 10 shows the eighth current path R8, and part (c) of FIG. 10 shows the ninth current path R9.

First Control Example

As shown in part (a) of FIG. 10, if a seventh current path (voltage supply short-circuit path) R7 is formed which goes from the first voltage supply E1, through the first switching element SW1, the second voltage supply E2, and the second switching element SW2, and back to the first voltage supply E1, the first switching element SW1 and the second switching element SW2 may be damaged by over-current.

Accordingly, in a first control example, the control device 20A is configured to control the control voltages of the first semiconductor switch S1 and the second semiconductor switch S2 so that the first switching element SW1 and the second switching element SW2 will not both be in their ON state at the same time.

As a result, the formation of a seventh current path R7 which goes from the first voltage supply E1, through the first switching element SW1, the second voltage supply E2, and the second switching element SW2, and back to the first voltage supply E1 can be avoided, which prevents damage to the first switching element SW1 and the second switching element SW2 due to over-current.

Second Control Example

Also, as shown in part (b) of FIG. 10, if an eighth current path (voltage supply short-circuit path) R8 is formed which goes from the first voltage supply E1, through the first switching element SW1 and the third switching element SW3, and back to the first voltage supply E1, the first switching element SW1 and the third switching element SW3 may be damaged by over-current.

Accordingly, in a second control example, the control device 20A is configured to control the control voltages of the first semiconductor switch S1 and the third semiconductor switch S3 so that the first switching element SW1 and the third switching element SW3 will not both be in their ON state at the same time. This is instead of, or in addition to, the above-mentioned control configuration.

As a result, the formation of an eighth current path R8 which goes from the first voltage supply E1, through the first switching element SW1 and the third switching element SW3, and back to the first voltage supply E1 can be avoided, which prevents damage to the first switching element SW1 and the third switching element SW3 due to over-current.

Third Control Example

Also, as shown in part (c) of FIG. 10, if a ninth current path (voltage supply short-circuit path) R9 is formed which goes from the second voltage supply E2, through the second switching element SW2 and the fourth switching element SW4, and back to the second voltage supply E2, the second switching element SW2 and the fourth switching element SW4 may be damaged by over-current.

Accordingly, in a second control example, the control device 20A is configured to control the control voltages of the second semiconductor switch S2 and the fourth semiconductor switch S4 so that the second switching element SW2 and the fourth switching element SW4 will not both be in their ON state at the same time. This is instead of, or in addition to, the above-mentioned control configuration.

As a result, the formation of a ninth current path R9 which goes from the second voltage supply E2, through the second switching element SW2 and the fourth switching element SW4, and back to the second voltage supply E2 can be avoided, which prevents damage to the second switching element SW2 and the fourth switching element SW4 due to over-current.

Second Embodiment

Figure 11:
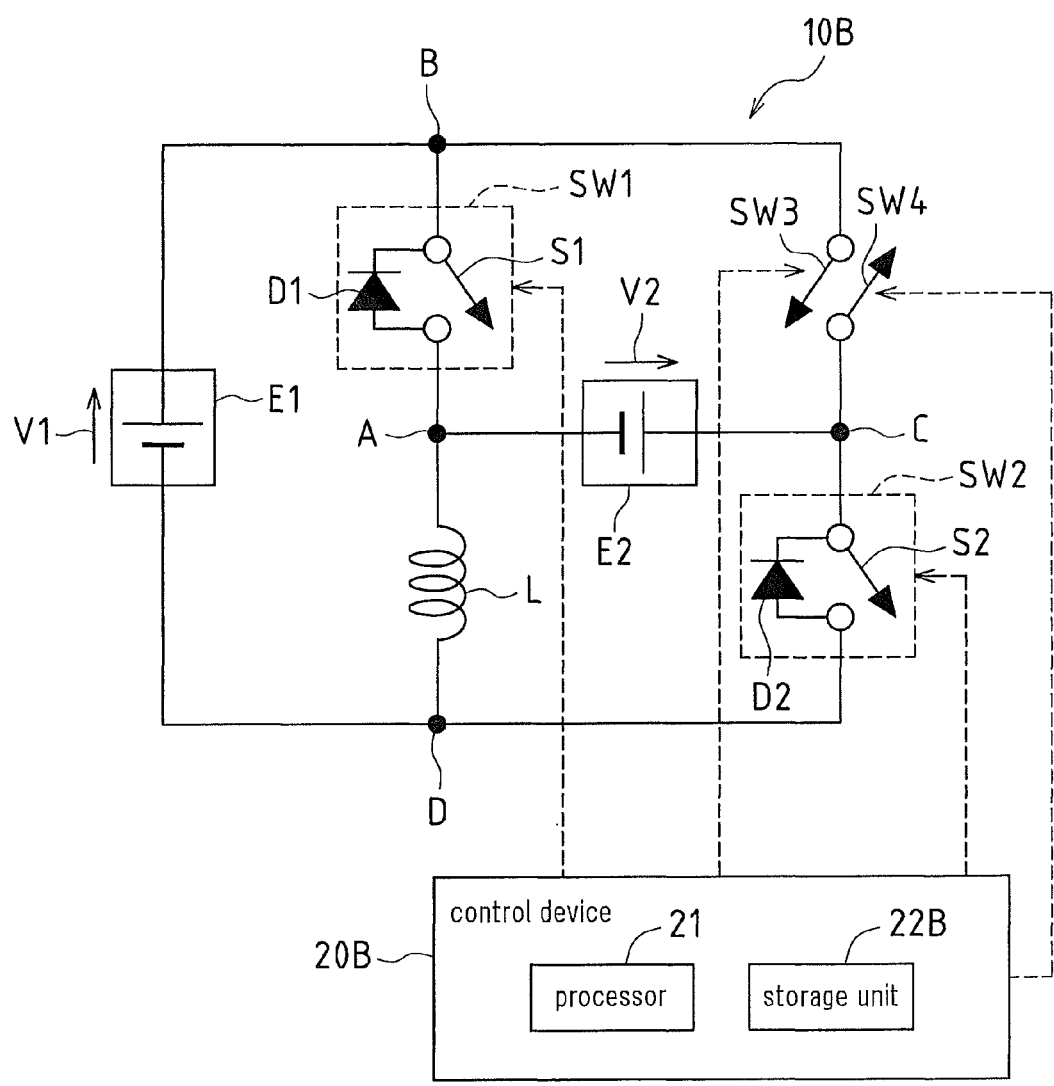
FIG. 11 is a circuit diagram showing the DC-DC converter circuit according to a second embodiment of the present invention.

FIG. 11 is a circuit diagram showing the DC-DC converter circuit 10B according to a second embodiment of the present invention. In FIG. 11 and in FIGS. 12 to 18 (discussed below), those members constituted substantially the same as in the first embodiment will be numbered the same.

The DC-DC converter circuit 10B shown in FIG. 11 includes a first switching element SW1, a second switching element SW2, an inductor L, a third switching element SW3, and a fourth switching element SW4.

The first switching element SW1 is made up of a first semiconductor switch S1 and a first diode D1. The first semiconductor switch S1 is a semiconductor device that controls current on and off in only one direction. The first diode D1 is connected in parallel to the first semiconductor switch S1 so that the first diode D1 allows current to flow in the opposite direction from the direction of on and off control by the first semiconductor switch S1.

The second switching element SW2 is made up of a second semiconductor switch S2 and a second diode D2. The second semiconductor switch S2 is a semiconductor device that controls current on and off in only one direction. The second diode D2 is connected in parallel to the second semiconductor switch S2 so that the second diode D2 allows current to flow in the opposite direction from the direction of on and off control by the second semiconductor switch S2.

The inductor L is connected at one end to the anode side (see connection point A) of the first diode D1 included in the first switching element SW1, and connected at the other end to the anode side (see connection point D) of the second diode D2 included in the second switching element SW2.

The third switching element SW3 is configured so that current can flow in only one direction from the cathode side of the first diode D1 included in the first switching element SW1 to the cathode side of the second diode D2 included in the second switching element SW2.

The fourth switching element SW4 is configured so that current can flow in only one direction from the cathode side of the second diode D2 included in the second switching element SW2 to the cathode side of the first diode D1 included in the first switching element SW1.

The DC-DC converter circuit 10B has a first voltage supply E1 connected between the cathode side (see connection point B) of the first diode D1 included in the first switching element SW1 and the anode side (see connection point D) of the second diode D2 included in the second switching element SW2 so that the first switching element SW1 side of the first voltage supply E1 becomes a positive pole.

Also, the DC-DC converter circuit 10B has a second voltage supply E2 connected between the anode side (see connection point A) of the first diode D1 included in the first switching element SW1 and the cathode side (see connection point C) of the second diode D2 included in the second switching element SW2 so that the second switching element SW2 side of the second voltage supply E2 becomes a positive pole.

When the DC-DC converter circuit 10B is applied to a work vehicle, for example, the first and second voltage supplies E1 and E2 can be batteries, capacitors, or other such electric accumulation devices. An inverter circuit or other such power conversion circuit can be connected to the first and second voltage supplies E1 and E2 to operate a motor or other such vehicle electric drive unit.

The DC-DC converter circuit 10B according to this second embodiment further includes a control device 20B. The control device 20B includes a processor 21 such as a CPU (central processing unit) and a storage unit 22B. The storage unit 22B includes a ROM (read-only memory), a RAM (random access memory), or other such memory, and is designed to store various control programs, necessary functions and tables, and various data.

The control device 20B is configured to control the switching operation of the first to fourth switching elements SW1 to SW4 of the DC-DC converter circuit 10B.

Examples of the operating modes indicating the ON and OFF states of the first to fourth switching elements SW1 to SW4 in the DC-DC converter circuit 10B according to this second embodiment include the following first to third modes in which operation is in powering mode, and the following fourth to sixth modes in which operation is in regeneration mode.

Figure 12:
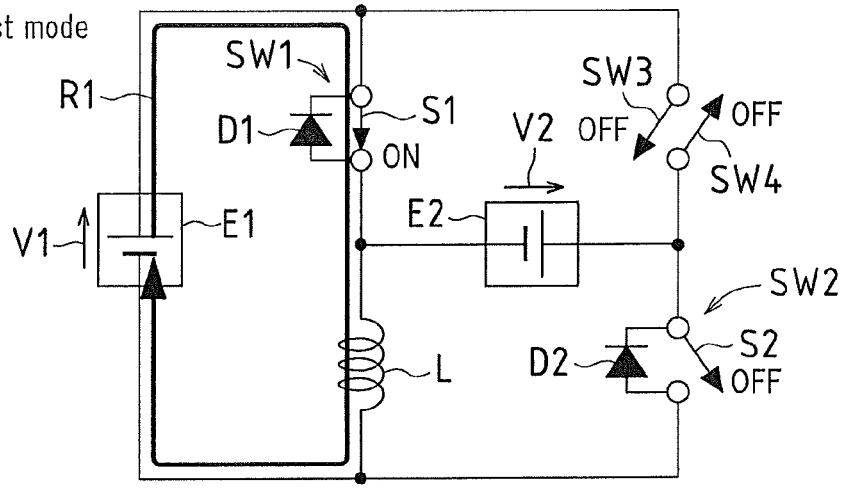
FIG. 12 consists of diagrams showing the state in which the DC-DC converter circuit shown in FIG. 11 is operating in powering mode, with part (a) of FIG. 12 showing the first mode, part (b) of FIG. 12 showing the second mode, and part (c) of FIG. 12 showing the third mode.
Figure 12:
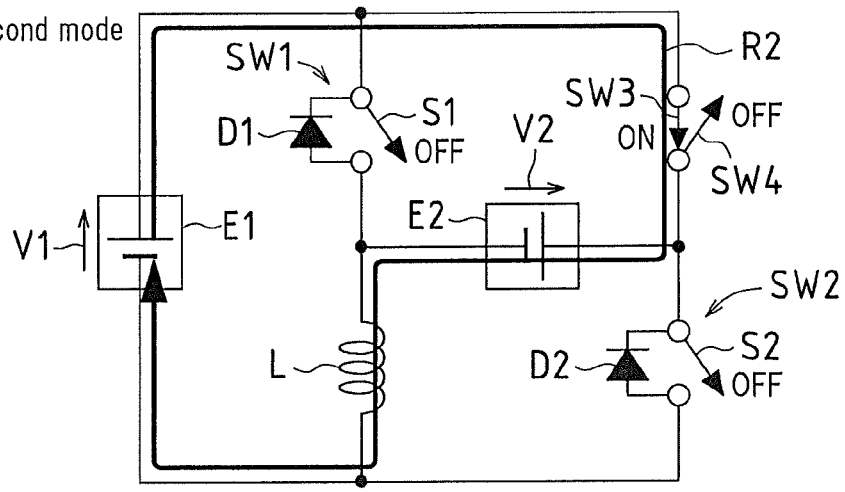
Figure 12:
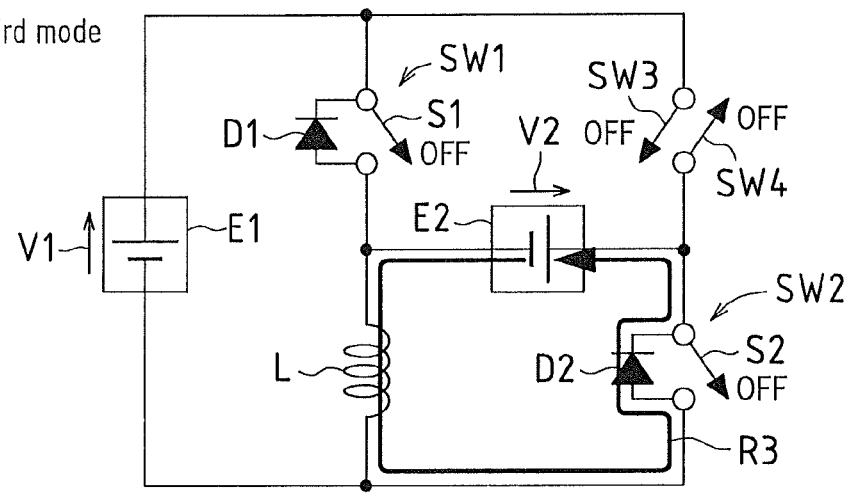

FIG. 12 consists of diagrams showing a state in which the DC-DC converter circuit 10B shown in FIG. 11 is operating in powering mode. Part (a) of FIG. 12 shows the first mode, part (b) of FIG. 12 shows the second mode, and part (c) of FIG. 12 shows the third mode.

Figure 13:
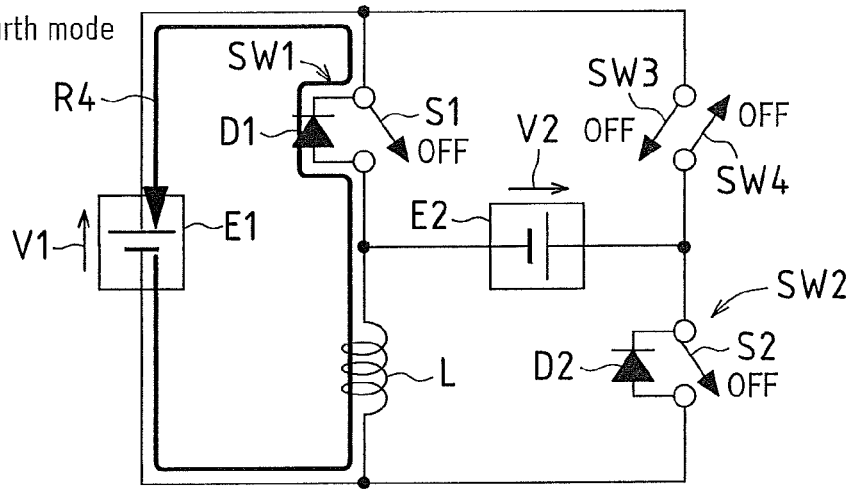
FIG. 13 consists of diagrams showing the state in which the DC-DC converter circuit shown in FIG. 11 is operating in regeneration mode, with part (a) of FIG. 13 showing the fourth mode, part (b) of FIG. 13 showing the fifth mode, and part (c) of FIG. 13 showing the sixth mode.
Figure 13:
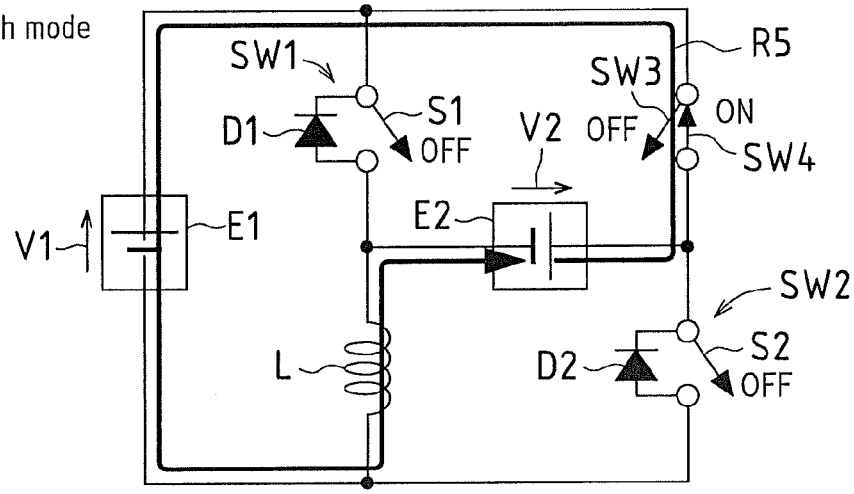
Figure 13:
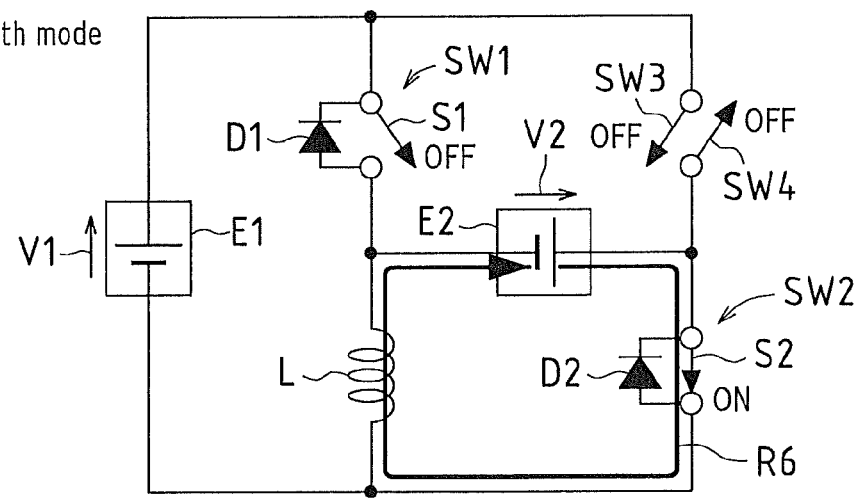

FIG. 13 consists of diagrams showing a state in which the DC-DC converter circuit 10B shown in FIG. 11 is operating in regeneration mode. part (a) of FIG. 13 shows the fourth mode, part (b) of FIG. 13 shows the fifth mode, and part (c) of FIG. 13 shows the sixth mode.

In powering mode, for example, as shown in part (a) of FIG. 12, the first mode is such that the first switching element SW1 is in its ON state, the second, third, and fourth switching elements SW2, SW3, and SW4 are in their OFF states, and a first current path R1 is formed which goes from the first voltage supply E1, through the first switching element SW1 and the inductor L, and back to the first voltage supply E1.

As shown in part (b) of FIG. 12, in the second mode the third switching element SW3 is in its ON state, the first, second, and fourth switching elements SW1, SW2, and SW4 are in their OFF states, and a second current path R2 is formed which goes from the first voltage supply E1, through the third switching element SW3, the second voltage supply E2, and the inductor L, and back to the first voltage supply E1.

As shown in part (c) of FIG. 12, in the third mode the first to fourth switching elements SW1 to SW4 are all in their OFF state, and a third current path R3 is formed which goes from the second voltage supply E2, through the inductor L and the second switching element SW2, and back to the second voltage supply E2.

In powering mode, various switching operations can be executed such that at least two modes from among the first mode, second mode, and third mode are switched at a short period (such as one selected from a range of about 10 to 100 kHz), according to the magnitude relation between the output voltage V1 of the first voltage supply E1 and the output voltage V2 of the second voltage supply E2.

More specifically, when the output voltage V1 of the first voltage supply E1 is greater than the output voltage V2 of the second voltage supply E2, a switching operation that switches between the second mode and the third mode can be executed, for example, and when the output voltage V1 of the first voltage supply E1 is less than the output voltage V2 of the second voltage supply E2, a switching operation that switches between the first mode and the second mode can be executed, for example. When the output voltage V1 of the first voltage supply E1 and the output voltage V2 of the second voltage supply E2 are equal, a switching operation that switches between the first mode and the third mode can be executed, for example, or only the second mode can be executed. Further, when the output voltage V1 of the first voltage supply E1 and the output voltage V2 of the second voltage supply E2 are substantially equal (when the absolute value of the difference between the voltage V1 and the voltage V2 is within a specific range), a switching operation that switches between the first mode and the third mode can be executed, or only the second mode can be executed.

In regeneration mode, as shown in part (a) of FIG. 13, for example, the fourth mode can be one in which the first to fourth switching elements SW1 to SW4 are all in their OFF state, and a fourth current path R4 is formed which goes from the first voltage supply E1, through the inductor L and the first switching element SW1, and back to the first voltage supply E1.

As shown in part (b) of FIG. 13, the fifth mode can be one in which the fourth switching element SW4 is in its ON state, the first, second, and third switching elements SW1, SW2, and SW3 are in their OFF state, and a fifth current path R5 is formed which goes from the second voltage supply E2, through the fourth switching element SW4, the first voltage supply E1, and the inductor L, and back to the second voltage supply E2.

As shown in part (c) of FIG. 13, the sixth mode can be one in which the second switching element SW2 is in its ON state, the first, third, and fourth switching elements SW1, SW3, and SW4 are in their OFF states, and a sixth current path R6 is formed which goes from the second voltage supply E2, through the second switching element SW2 and the inductor L, and back to the second voltage supply E2.

In regeneration mode, various switching operations can be executed such that at least two modes from among the fourth mode, fifth mode, and sixth mode are switched at a short period (such as one selected from a range of about 10 to 100 kHz), according to the magnitude relation between the output voltage V1 of the first voltage supply E1 and the output voltage V2 of the second voltage supply E2.

More specifically, when the output voltage V1 of the first voltage supply E1 is greater than the output voltage V2 of the second voltage supply E2, a switching operation that switches between the fifth mode and the sixth mode can be executed, for example, and when the output voltage V1 of the first voltage supply E1 is less than the output voltage V2 of the second voltage supply E2, a switching operation that switches between the fourth mode and the fifth mode can be executed, for example. When the output voltage V1 of the first voltage supply E1 and the output voltage V2 of the second voltage supply E2 are equal, a switching operation that switches between the fourth mode and the sixth mode can be executed, for example, or only the fifth mode can be executed. Further, when the output voltage V1 of the first voltage supply E1 and the output voltage V2 of the second voltage supply E2 are substantially equal (when the absolute value of the difference between the voltage V1 and the voltage V2 is within a specific range), a switching operation that switches between the fourth mode and the sixth mode can be executed, or only the fifth mode can be executed.

The output voltage V1 of the first voltage supply E1 and the output voltage V2 of the second voltage supply E2 can be measured with a voltage meter (not shown).

As described above, with the DC-DC converter circuit 10B according to the second embodiment of the present invention, the output voltages V1 and V2 can be stepped up and down in both directions between the first voltage supply E1 and the second voltage supply E2. Also, power can be supplied in both directions between the first voltage supply E1 and the second voltage supply E2. Furthermore, current only needs to pass through the first switching element SW1 in the first mode (see part (a) of FIG. 12) and the fourth mode (see part (a) of FIG. 13), through the third switching element SW3 in the second mode (see part (b) of FIG. 12), through the fourth switching element SW4 in the fifth mode (see part (b) of FIG. 13), and through the second switching element SW2 in the third mode (see part (c) of FIG. 12) and the sixth mode (see part (c) of FIG. 13). In other words, in any mode, from the first to the sixth (whether in powering mode or regeneration mode), current can be passed through at least one of the switching elements (half the switching elements compared to the conventional art), conduction loss can be correspondingly reduced, and this affords an increase in power conversion efficiency.

In particular, the shorter is the switching period of each mode, the greater is the switching loss with the first to fourth switching elements SW1 to SW4, so the above-mentioned effect is correspondingly greater.

An IGBT, MOSFET, or GTO are examples that can be used as semiconductor switches in the first to fourth switching elements SW1 to SW4. A MOSFET is usually used with systems of about 200 V or less, and an IGBT with about 2 kV or less. Also, when a MOSFET is used for the first to fourth switching elements SW1 to SW4, conduction loss with this MOSFET can be reduced by synchronous rectification in which the MOSFET is switched ON when current is flowing to a back-to-back connected diode.

Figure 14:
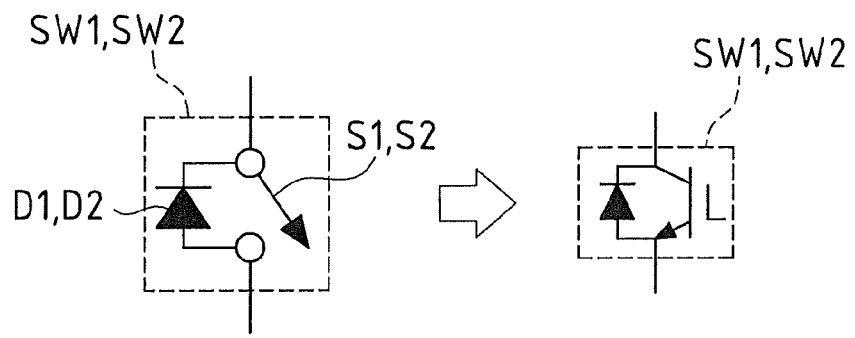
FIG. 14 consists of diagrams showing examples of semiconductor switches that can be used for the first to fourth switching elements in the DC-DC converter circuit shown in FIG. 11, with part (a) of FIG. 14 showing an example in which a reverse conducting IGBT element is used as the first and second switching elements, part (b) of FIG. 14 showing an example in which the connection configuration between the third switching element and the fourth switching element is made up of only a reverse-blocking IGBT element, part (c) of FIG. 14 showing an example in which the connection configuration between the third switching element and the fourth switching element is made up of a reverse conducting IGBT and a diode, and part (d) of FIG. 14 showing an example in which the connection configuration between the third switching element and the fourth switching element is made up of a reverse conducting IGBT.
Figure 14:
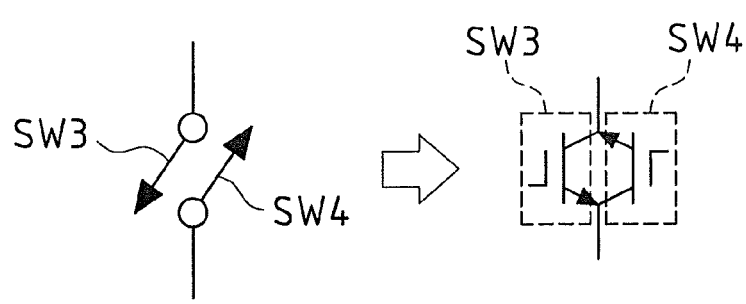
Figure 14:
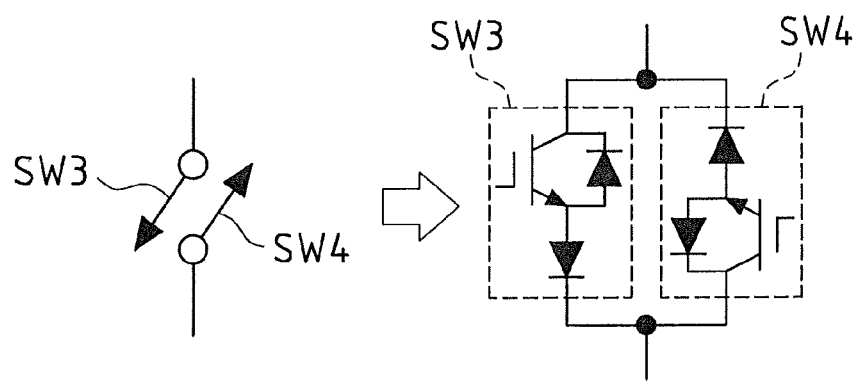
Figure 14:
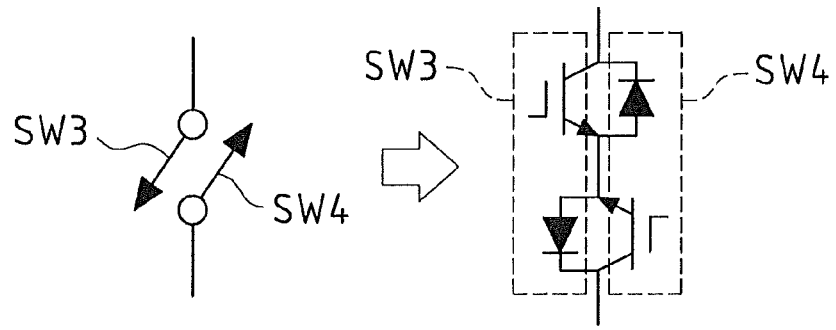

FIG. 14 consists of diagrams showing examples of semiconductor switches that can be used for the first to fourth switching elements SW1 to SW4 in the DC-DC converter circuit 10B shown in FIG. 11. Part (a) of FIG. 14 shows an example (on the right side in the drawing) in which a reverse conducting IGBT element is used as the first and second switching elements SW1 and SW2. Part (b) of FIG. 14 shows an example (on the right side in the drawing) in which the connection configuration between the third switching element SW3 and the fourth switching element SW4 is made up of only a reverse-blocking IGBT. Part (c) of FIG. 14 shows an example (on the right side in the drawing) in which the connection configuration between the third switching element SW3 and the fourth switching element SW4 is made up of a reverse conducting IGBT and a diode. Part (d) of FIG. 14 shows an example (on the right side in the drawing) in which the connection configuration between the third switching element SW3 and the fourth switching element SW4 is made up of a reverse conducting IGBT. The connection examples shown in parts (c) and (d) of FIG. 14 will be described below in the first and second examples.

In the example shown in FIG. 14, the semiconductor switch is an IGBT, but the semiconductor switch may instead be a MOSFET or a GTO.

The first to fourth switching elements SW1 to SW4 can also be a 2-in-1 module in which two reverse conducting semiconductor elements are connected in series and integrated.

Figure 15:
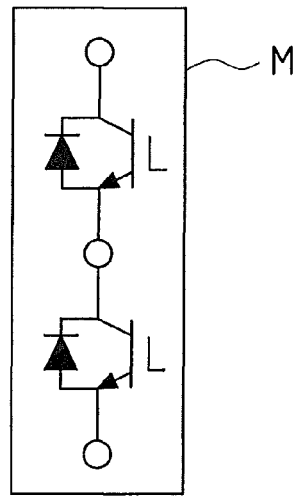
FIG. 15 is a diagram of an example of a 2-in-1 module that can be used for the first to fourth switching elements in the DC-DC converter circuit shown in FIG. 11.

FIG. 15 is a diagram of an example of a 2-in-1 module that can be used for the first to fourth switching elements SW1 to SW4 in the DC-DC converter circuit 10B shown in FIG. 11. In the example shown in FIG. 15, the 2-in-1 module M is constituted by reverse conducting IGBT elements. This is not the only option, however, and the 2-in-1 module may instead be constituted by reverse conducting MOSFET elements, or reverse conducting GTO elements.

The following first and second examples can be given as examples that can constitute a circuit to which a 2-in-1 module can be applied with the DC-DC converter circuit 10B.

First Example

Figure 16:
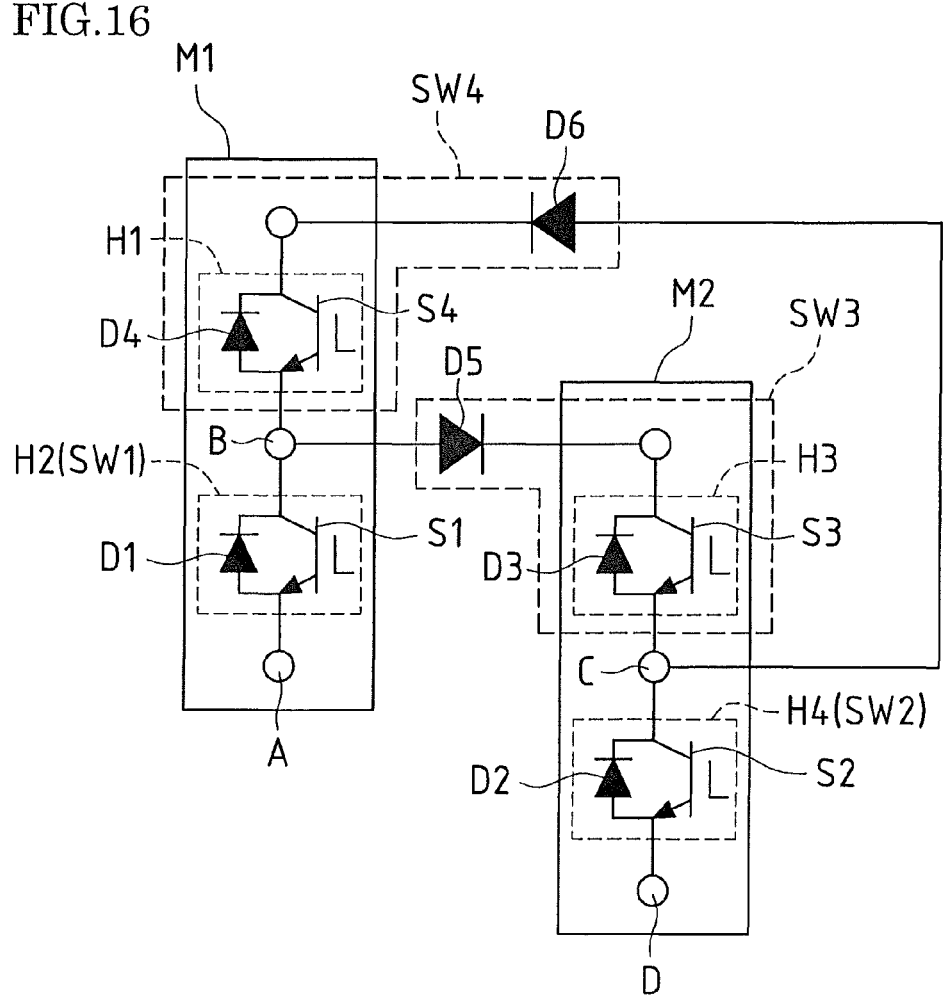
FIG. 16 is a circuit diagram of a first example that can constitute a circuit to which a 2-in-1 module can be applied in the DC-DC converter circuit shown in FIG. 11.

FIG. 16 is a circuit diagram of a first example that can constitute a circuit to which a 2-in-1 module can be applied in the DC-DC converter circuit 10B shown in FIG. 11. The connection points A to D shown in FIG. 16 correspond to the respective connection points A to D shown in FIG. 11. Also, the voltage supply and so forth are not shown in FIG. 16. The same holds true for the circuit in FIG. 17 discussed below.

As shown in FIG. 16, in the first example, the third switching element SW3 is made up of a third semiconductor switch S3 with which current can be controlled on and off in only one direction, a third diode D3, and a fifth diode D5.

The fourth switching element SW4 is made up of a fourth semiconductor switch S4 with which current can be controlled on and off in only one direction, a fourth diode D4, and a sixth diode D6.

The third diode D3 is connected in parallel to the third semiconductor switch S3 so that the third diode D3 allows current to flow in the opposite direction from the direction of on and off control by the third semiconductor switch S3.

The fourth diode D4 is connected in parallel to the fourth semiconductor switch S4 so that the fourth diode D4 allows current to flow in the opposite direction from the direction of on and off control by the fourth semiconductor switch S4.

The fifth diode D5 is connected between the cathode side of the third diode D3 connected in parallel to the third semiconductor switch S3 and the cathode side (see connection point B) of the first diode D1 included in the first switching element SW1 so that the fifth diode D5 allows current to flow in the opposite direction from the third diode D3.

The sixth diode D6 is connected between the cathode side of the fourth diode D4 connected in parallel to the fourth semiconductor switch S4 and the cathode side (see connection point C) of the second diode D2 included in the second switching element SW2 so that the sixth diode D6 allows current to flow in the opposite direction from the fourth diode D4.

The anode side of the third diode D3 connected in parallel to the third semiconductor switch S3 is connected to the cathode side (see connection point C) of the second diode D2 included in the second switching element SW3. The anode side of the fourth diode D4 connected in parallel to the fourth semiconductor switch S4 is connected to the cathode side (see connection point B) of the first diode D1 included in the first switching element SW1.

In this first example, the semiconductor element composed of the fourth semiconductor switch S4 and the fourth diode D4 can serve as a first reverse conducting semiconductor element H1 of the upper arm, and the semiconductor element (first switching element SW1) composed of the first semiconductor switch S1 and the first diode D1 can serve as a second reverse conducting semiconductor element H2 of the lower arm.

Consequently, with the DC-DC converter circuit 10B, the first reverse conducting semiconductor element H1 and the second reverse conducting semiconductor element H2 can be connected in series and integrated for use as a 2-in-1 module M1.

Also, the semiconductor element composed of the third semiconductor switch S3 and the third diode D3 can serve as a third reverse conducting semiconductor element H3 of the upper arm, and the semiconductor element (second switching element SW2) composed of the second semiconductor switch S2 and the second diode D2 can serve as a fourth reverse conducting semiconductor element H4 of the lower arm.

Consequently, with the DC-DC converter circuit 10B, the third reverse conducting semiconductor element H3 and the fourth reverse conducting semiconductor element H4 can be connected in series and integrated for use as a 2-in-1 module M2.

Since the 2-in-1 modules M1 and M2 can thus be used, a circuit configuration that is more convenient to use can be realized.

Second Example

Figure 17:
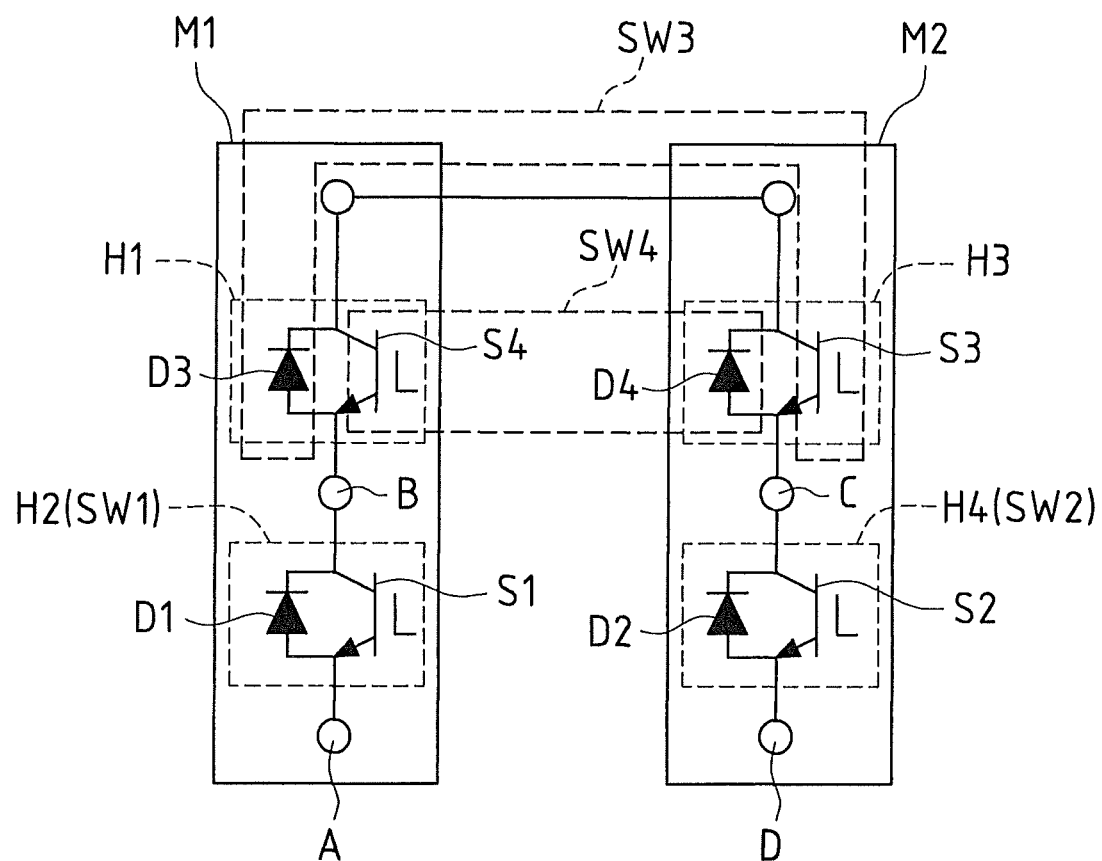
FIG. 17 is a circuit diagram of a second example that can constitute a circuit to which a 2-in-1 module can be applied in the DC-DC converter circuit shown in FIG. 11.

FIG. 17 is a circuit diagram of a second example that can constitute a circuit to which a 2-in-1 module can be applied in the DC-DC converter circuit 10B shown in FIG. 11.

As shown in FIG. 17, in the second example the third switching element SW3 is made up of a third semiconductor switch S3 with which current can be controlled on and off in only one direction, and a third diode D3.

The fourth switching element SW4 is made up of a fourth semiconductor switch S4 with which current can be controlled on and off in only one direction, and a fourth diode D4.

The third diode D3 is connected in parallel to the fourth semiconductor switch S4 so that the third diode D3 allows current to flow in the opposite direction from the direction of on and off control by the fourth semiconductor switch S4.

The fourth diode D4 is connected in parallel to the third semiconductor switch S3 so that the fourth diode D4 allows current to flow in the opposite direction from the direction of on and off control by the third semiconductor switch S3.

The anode side of the third diode D3 connected in parallel to the fourth semiconductor switch S4 is connected to the cathode side (see connection point B) of the first diode D1 included in the first switching element SW1. The anode side of the fourth diode D4 connected in parallel to the third semiconductor switch S3 is connected to the cathode side (see connection point C) of the second diode D2 included in the second switching element SW2. Also, the cathode sides of the third diode D3 and the fourth diode D4 are connected.

In this second example, the semiconductor element composed of the fourth semiconductor switch S4 and the third diode D3 can serve as a first reverse conducting semiconductor element H1 of the upper arm, and the semiconductor element (first switching element SW1) composed of the first semiconductor switch S1 and the first diode D1 can serve as a second reverse conducting semiconductor element H2 of the lower arm.

Consequently, with the DC-DC converter circuit 10B, the first reverse conducting semiconductor element H1 and the second reverse conducting semiconductor element H2 can be connected in series and integrated for use as a 2-in-1 module M1.

Also, the semiconductor element composed of the third semiconductor switch S3 and the fourth diode D4 can serve as a third reverse conducting semiconductor element H3 of the upper arm, and the (second switching element SW2) composed of the second semiconductor switch S2 and the second diode D2 can serve as a fourth reverse conducting semiconductor element H4 of the lower arm.

Consequently, with the DC-DC converter circuit 10B, the third reverse conducting semiconductor element H3 and the fourth reverse conducting semiconductor element H4 can be connected in series and integrated for use as a 2-in-1 module M2.

Since the 2-in-1 modules M1 and M2 can thus be used, a circuit configuration that is more convenient to use can be realized.

Furthermore, since, unlike in the first example, there is no need to provide the fifth diode D5 and the sixth diode D6, the circuit configuration can be that much simpler.

Next, control examples by the control device 20B of the first to fourth switching elements SW1 to SW4 will be described.

In this second embodiment, the DC-DC converter circuit 10B includes a protection function that performs a control example of the following switching operation with the control device 20B, for the purpose of preventing damage to the first to fourth switching elements SW1 to SW4 due to over-current.

Figure 18:
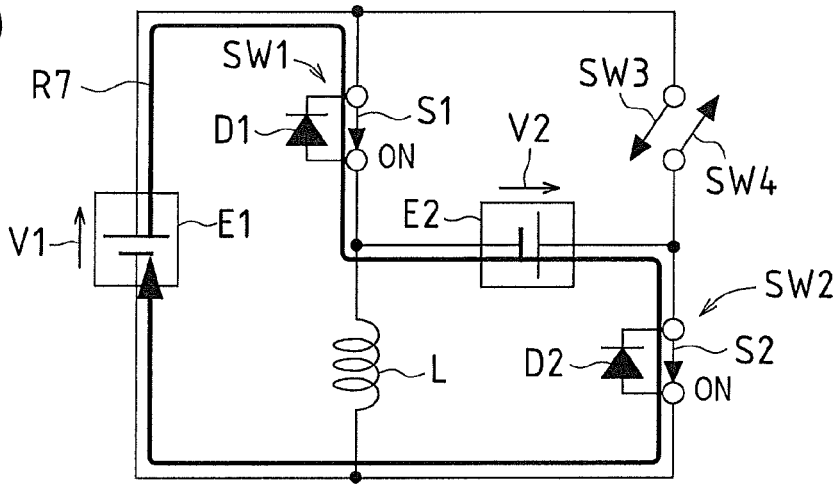
FIG. 18 consists of diagrams showing seventh to ninth current paths that are prohibited by first to third control examples of the switching operation of the first to fourth switching elements in the DC-DC converter circuit shown in FIG. 11, with part (a) of FIG. 18 showing the seventh current path, part (b) of FIG. 18 showing the eighth current path, and part (c) of FIG. 18 showing the ninth current path.
Figure 18:
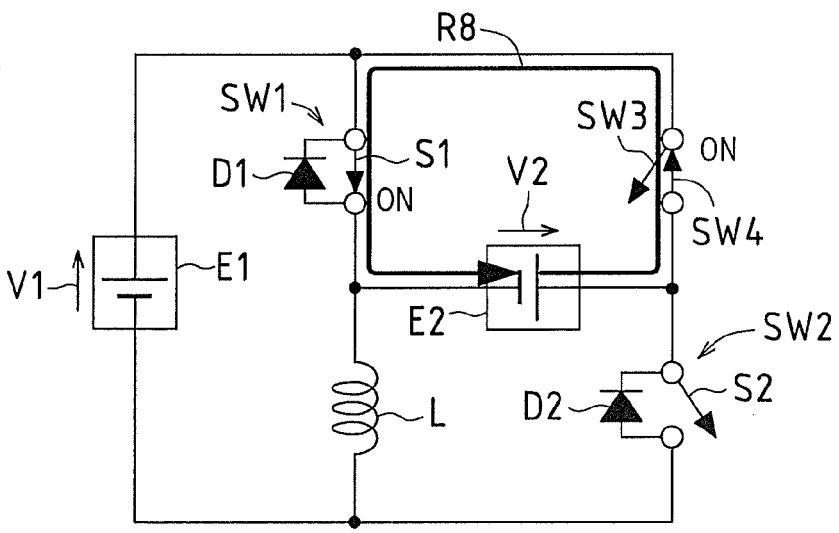
Figure 18:
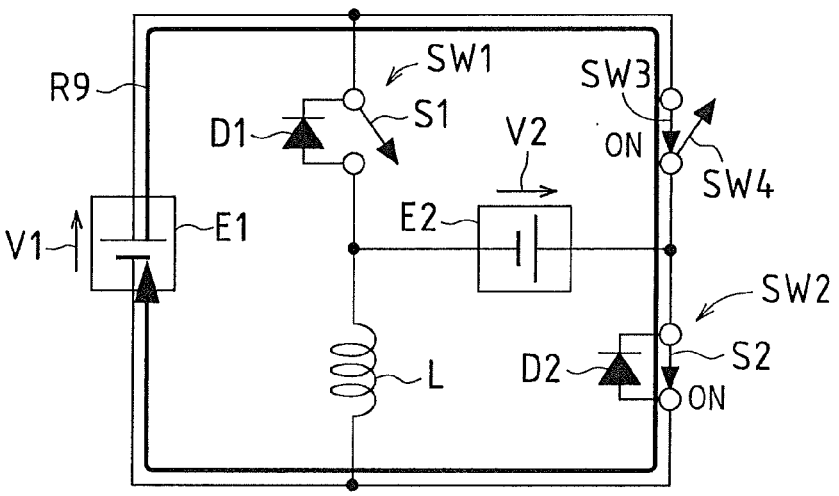
Figure 19:
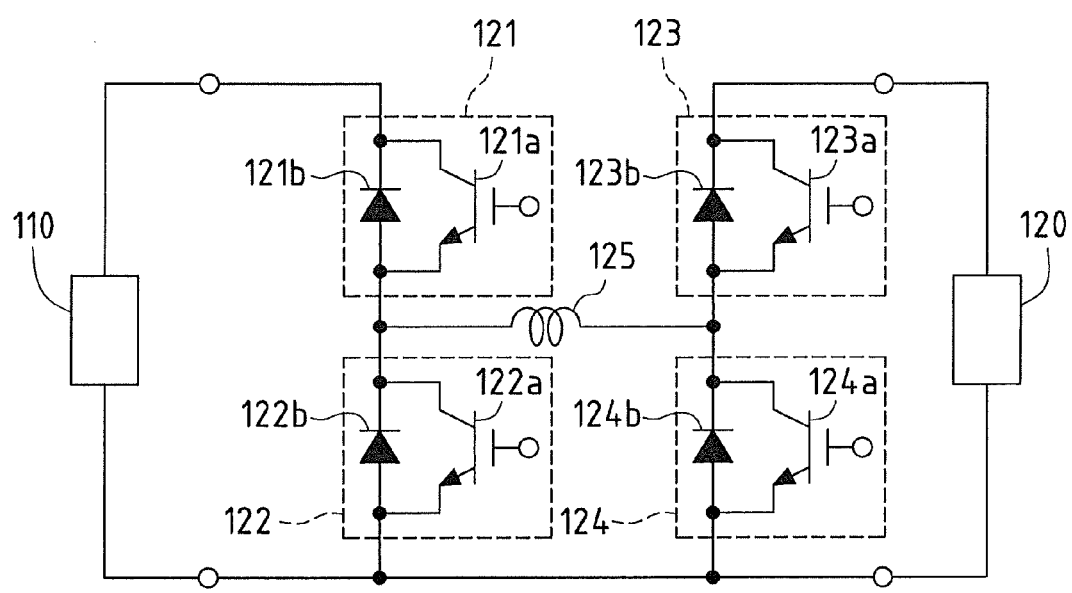
FIG. 19 is a circuit diagram showing an example of a conventional DC-DC converter circuit.
Figure 20:
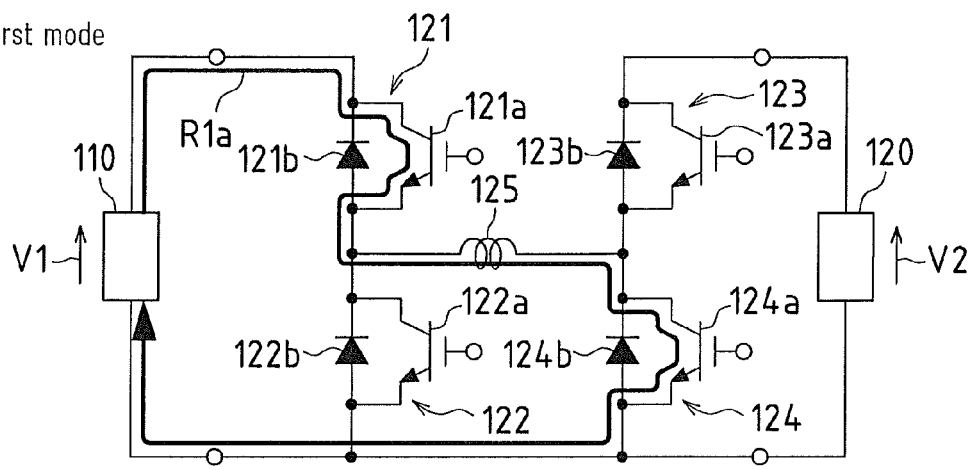
FIG. 20 consists of diagrams showing the state in which the DC-DC converter circuit shown in FIG. 19 is operating in powering mode, with part (a) of FIG. 20 showing the first mode, part (b) of FIG. 20 showing the second mode, and part (c) of FIG. 20 showing the third mode.
Figure 20:
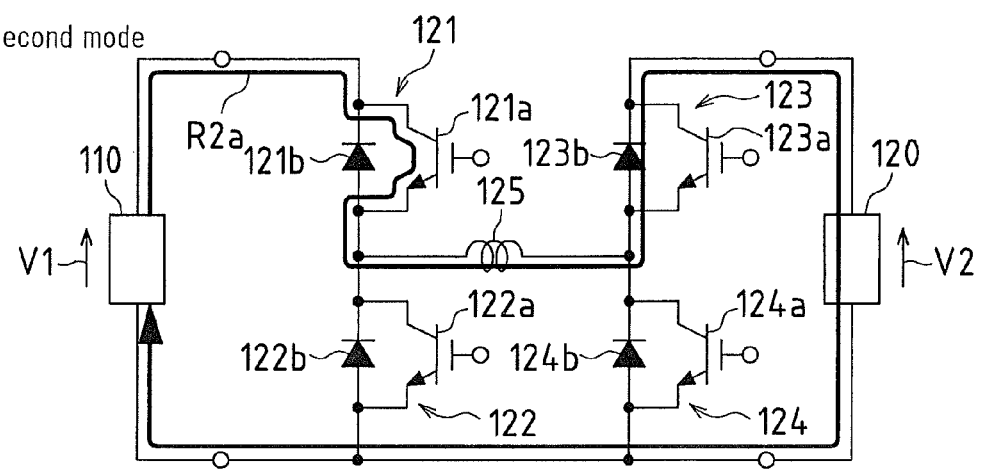
Figure 20:
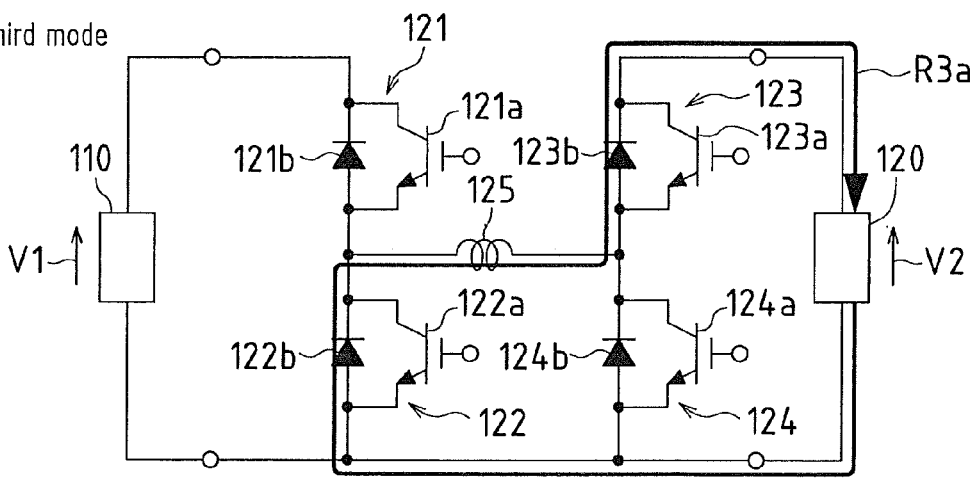
Figure 21:
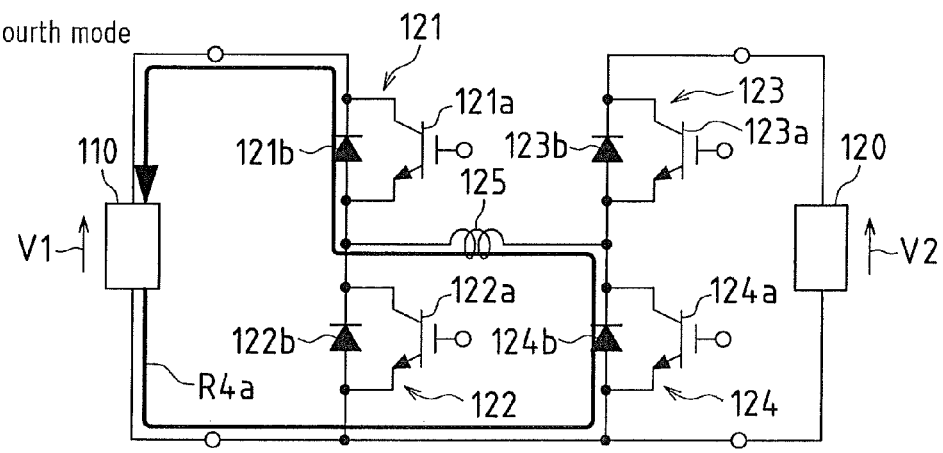
FIG. 21 consists of diagrams showing the state in which the DC-DC converter circuit shown in FIG. 19 is operating in regeneration mode, with part (a) of FIG. 21 showing the fourth mode, part (b) of FIG. 21 showing the fifth mode, and part (c) of FIG. 21 showing the sixth mode.
Figure 21:
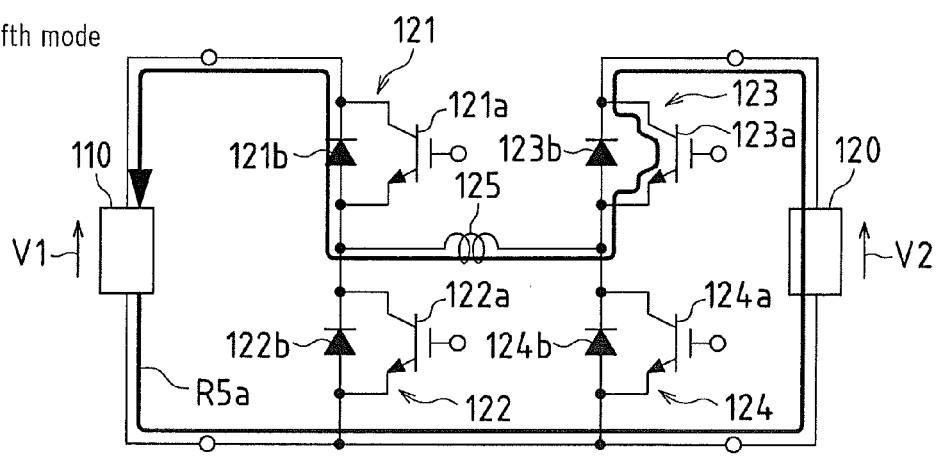
Figure 21:
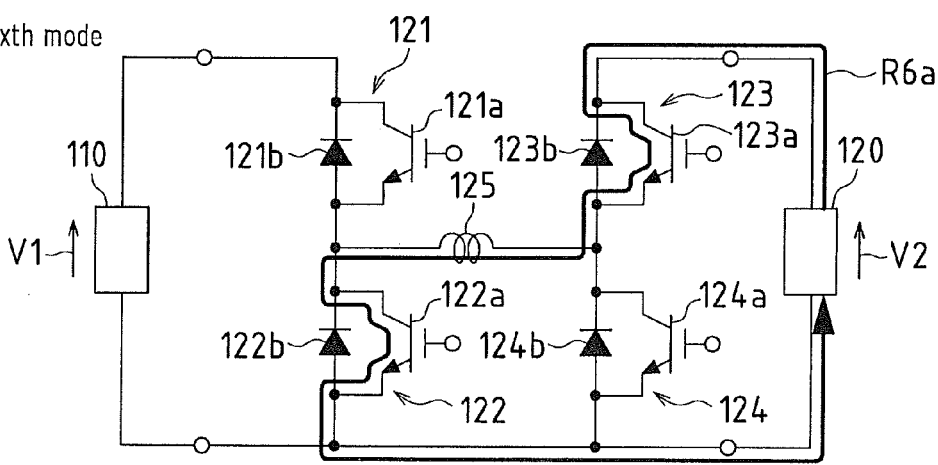

FIG. 18 consists of diagrams showing seventh to ninth current paths R7 to R9 that are prohibited by first to third control examples of the switching operation of the first to fourth switching elements SW1 to SW4 in the DC-DC converter circuit 10B shown in FIG. 11. Part (a) of FIG. 18 shows the seventh current path R7, part (b) of FIG. 18 shows the eighth current path R8, and part (c) of FIG. 18 shows the ninth current path R9.

First Control Example

As shown in part (a) of FIG. 18, if a seventh current path (voltage supply short-circuit path) R7 is formed which goes from the first voltage supply E1, through the first switching element SW1, the second voltage supply E2, and the second switching element SW2, and back to the first voltage supply E1, the first switching element SW1 and the second switching element SW2 may be damaged by over-current.

Accordingly, in a first control example, the control device 20B is configured to control the control voltages of the first semiconductor switch S1 and the second semiconductor switch S2 so that the first switching element SW1 and the second switching element SW2 will not both be in their ON state at the same time.

As a result, the formation of a seventh current path R7 which goes from the first voltage supply E1, through the first switching element SW1, the second voltage supply E2, and the second switching element SW2, and back to the first voltage supply E1 can be avoided, which prevents damage to the first switching element SW1 and the second switching element SW2 due to over-current.

Second Control Example

Also, as shown in part (b) of FIG. 18, if an eighth current path (voltage supply short-circuit path) R8 is formed which goes from the second voltage supply E2, through the fourth switching element SW4 and the first switching element SW1, and back to the second voltage supply E2, the first switching element SW1 and the fourth switching element SW4 may be damaged by over-current.

Accordingly, in a second control example, the control device 20B is configured to control the control voltages of the first semiconductor switch S1 and the fourth semiconductor switch S4 so that the first switching element SW1 and the fourth switching element SW4 will not both be in their ON state at the same time. This is instead of, or in addition to, the above-mentioned control configuration.

As a result, the formation of an eighth current path R8 which goes from the second voltage supply E2, through the fourth switching element SW4 and the first switching element SW1, and back to the second voltage supply E2 can be avoided, which prevents damage to the first switching element SW1 and the fourth switching element SW4 due to over-current.

Third Control Example

Also, as shown in part (c) of FIG. 18, if a ninth current path (voltage supply short-circuit path) R9 is formed which goes from the first voltage supply E1, through the third switching element SW3 and the second switching element SW2, and back to the first voltage supply E1, the second switching element SW2 and the third switching element SW3 may be damaged by over-current.

Accordingly, in a second control example, the control device 20B is configured to control the control voltages of the second semiconductor switch S2 and the third semiconductor switch S3 so that the second witching element SW2 and the third switching element SW3 will not both be in their ON state at the same time. This is instead of, or in addition to, the above-mentioned control configuration.

As a result, the formation of a ninth current path R9 which goes from the first voltage supply E1, through the third switching element SW3 and the second switching element SW2, and back to the first voltage supply E1 can be avoided, which prevents damage to the second switching element SW2 and the third switching element SW3 due to over-current.

REFERENCE SIGNS LIST

10A DC-DC converter circuit
10B DC-DC converter circuit
20A control device
20B control device
D1 first diode
D2 second diode
D3 third diode
D4 fourth diode
D5 fifth diode
D6 sixth diode
E1 first voltage supply
E2 second voltage supply
L inductor
S1 first semiconductor switch
S2 second semiconductor switch S3 third semiconductor switch
S4 fourth semiconductor switch
SW1 first switching element
SW2 second switching element
SW3 third switching element
SW4 fourth switching element

The invention claimed is:

1. A DC-DC converter circuit, comprising:
a first switching element including a first semiconductor switch with which current can be controlled on and off in one direction, and a first diode connected in parallel to the first semiconductor switch so that the first diode allows current to flow in the opposite direction from the direction of on and off control by the first semiconductor switch;
a second switching element including a second semiconductor switch with which current can be controlled on and off in one direction, and a second diode connected in parallel to the second semiconductor switch so that the second diode allows current to flow in the opposite direction from the direction of on and off control by the second semiconductor switch;
an inductor connected at one end to the cathode side of the first diode included in the first switching element, and connected at the other end to the cathode side of the second diode included in the second switching element;
a third switching element provided so that current can flow in one direction from an anode side of the first diode included in the first switching element to an anode side of the second diode included in the second switching element; and
a fourth switching element provided so that current can flow in one direction from the anode side of the second diode included in the second switching element to the anode side of the first diode included in the first switching element,
wherein a first voltage supply is connected between the cathode side of the first diode included in the first switching element and the anode side of the second diode included in the second switching element so that the first switching element side of the first voltage supply becomes a positive pole, an anode of the first voltage supply being connected to an input side of the fourth switching element, and
a second voltage supply is connected between the anode side of the first diode included in the first switching element and the cathode side of the second diode included in the second switching element so that the second switching element side of the second voltage supply becomes a positive pole, an anode of the second voltage supply being connected to an input side of the third switching element.

2. The DC-DC converter circuit according to claim 1,
wherein the third switching element includes a third semiconductor switch with which current can be controlled on and off in one direction, a third diode, and a fifth diode,
the fourth switching element includes a fourth semiconductor switch with which current can be controlled on and off in one direction, a fourth diode, and a sixth diode,
the third diode is connected in parallel to the third semiconductor switch so that the third diode allows current to flow in the opposite direction from the direction of on and off control by the third semiconductor switch,
the fourth diode is connected in parallel to the fourth semiconductor switch so that the fourth diode allows current to flow in the opposite direction from the direction of on and off control by the fourth semiconductor switch,
the fifth diode is connected between the anode side of the third diode connected in parallel to the third semiconductor switch and the anode side of the second diode included in the second switching element so that the fifth diode allows current to flow in the opposite direction from the third diode,
the sixth diode is connected between the anode side of the fourth diode connected in parallel to the fourth semiconductor switch and the anode side of the first diode included in the first switching element so that the sixth diode allows current to flow in the opposite direction from the fourth diode,
the cathode side of the third diode connected in parallel to the third semiconductor switch is connected to the anode side of the first diode included in the first switching element, and
the cathode side of the fourth diode connected in parallel to the fourth semiconductor switch is connected to the anode side of the second diode included in the second switching element.

3. The DC-DC converter circuit according to claim 1,
wherein the third switching element includes a third semiconductor switch with which current can be controlled on and off in one direction, and a third diode,
the fourth switching element includes a fourth semiconductor switch with which current can be controlled on and off in one direction, and a fourth diode,
the third diode is connected in parallel to the fourth semiconductor switch so that the third diode allows current to flow in the opposite direction from the direction of on and off control by the fourth semiconductor switch,
the fourth diode is connected in parallel to the third semiconductor switch so that the fourth diode allows current to flow in the opposite direction from the direction of on and off control by the third semiconductor switch,
the cathode side of the third diode connected in parallel to the fourth semiconductor switch is connected to the anode side of the second diode included in the second switching element,
the cathode side of the fourth diode connected in parallel to the third semiconductor switch is connected to the anode side of the first diode included in the first switching element, and
the anode sides of the third diode and the fourth diode are connected.

4. The DC-DC converter circuit according to claim 1,
wherein the third switching element includes a third semiconductor switch with which current can be controlled on and off in one direction, a third diode, and a fifth diode,
the fourth switching element includes a fourth semiconductor switch with which current can be controlled on and off in one direction, a fourth diode, and a sixth diode,
the third diode is connected in parallel to the third semiconductor switch so that the third diode allows current to flow in the opposite direction from the direction of on and off control by the third semiconductor switch,
the fourth diode is connected in parallel to the fourth semiconductor switch so that the fourth diode allows current to flow in the opposite direction from the direction of on and off control by the fourth semiconductor switch,
the fifth diode is connected between the cathode side of the third diode connected in parallel to the third semiconductor switch and the anode side of the first diode included in the first switching element so that the fifth diode allows current to flow in the opposite direction from the third diode, the sixth diode is connected between the cathode side of the fourth diode connected in parallel to the fourth semiconductor switch and the anode side of the second diode included in the second switching element so that the sixth diode allows current to flow in the opposite direction from the fourth diode, the anode side of the third diode connected in parallel to the third semiconductor switch is connected to the anode side of the second diode included in the second switching element, and the anode side of the fourth diode connected in parallel to the fourth semiconductor switch is connected to the anode side of the first diode included in the first switching element.

5. The DC-DC converter circuit according to claim 1, wherein the third switching element includes a third semiconductor switch with which current can be controlled on and off in one direction, and a third diode, the fourth switching element includes a fourth semiconductor switch with which current can be controlled on and off in one direction, and a fourth diode, the third diode is connected in parallel to the fourth semiconductor switch so that the third diode allows current to flow in the opposite direction from the direction of on and off control by the fourth semiconductor switch, the fourth diode is connected in parallel to the third semiconductor switch so that the fourth diode allows current to flow in the opposite direction from the direction of on and off control by the third semiconductor switch, the anode side of the third diode connected in parallel to the fourth semiconductor switch is connected to the anode side of the first diode included in the first switching element, the anode side of the fourth diode connected in parallel to the third semiconductor switch is connected to the anode side of the second diode included in the second switching element, and the cathode sides of the third diode and the fourth diode are connected.

6. The DC-DC converter circuit according to claim 1, comprising means for controlling so that the first switching element and the second switching element are not both in an ON state at the same time.

7. The DC-DC converter circuit according to claim 1, comprising means for controlling so that the first switching element and the third switching element are not both in an ON state at the same time.

8. The DC-DC converter circuit according to claim 1, comprising means for controlling so that the second switching element and the fourth switching element are not both in an ON state at the same time.

9. A DC-DC converter circuit comprising:

a first switching element including a first semiconductor switch with which current can be controlled on and off in one direction, and a first diode connected in parallel to the first semiconductor switch so that the first diode allows current to flow in the opposite direction from the direction of on and off control by the first semiconductor switch;

a second switching element including a second semiconductor switch with which current can be controlled on and off in one direction, and a second diode connected in parallel to the second semiconductor switch so that the second diode allows current to flow in the opposite direction from the direction of on and off control by the second semiconductor switch;

an inductor connected at one end to the anode side of the first diode included in the first switching element, and connected at the other end to the anode side of the second diode included in the second switching element;

a third switching element provided so that current can flow in one direction from the cathode side of the first diode included in the first switching element to the cathode side of the second diode included in the second switching element; and a fourth switching element provided so that current can flow in one direction from the cathode side of the second diode included in the second switching element to the cathode side of the first diode included in the first switching element, wherein a first voltage supply is connected between the cathode side of the first diode in the first switching element and the anode side of the second diode included in the second switching element so that the first switching element side of the first voltage supply becomes a positive pole, the anode of the first voltage supply being connected to the other end of the inductor, and a second voltage supply is connected between the anode side of the first diode included in the first switching element and the cathode side of the second diode included in the second switching element so that the second switching element side of the second voltage supply becomes a positive pole, the anode of the second voltage supply being connected to the one end of the inductor.

10. The DC-DC converter circuit according to claim 9, wherein the third switching element includes a third semiconductor switch with which current can be controlled on and off in one direction, a third diode, and a fifth diode, the fourth switching element includes a fourth semiconductor switch with which current can be controlled on and off in one direction, a fourth diode, and a sixth diode, the third diode is connected in parallel to the third semiconductor switch so that the third diode allows current to flow in the opposite direction from the direction of on and off control by the third semiconductor switch, the fourth diode is connected in parallel to the fourth semiconductor switch so that the fourth diode allows current to flow in the opposite direction from the direction of on and off control by the fourth semiconductor switch, the fifth diode is connected between the cathode side of the third diode connected in parallel to the third semiconductor switch and the cathode side of the first diode included in the first switching element so that the fifth diode allows current to flow in the opposite direction from the third diode, the sixth diode is connected between the cathode side of the fourth diode connected in parallel to the fourth semiconductor switch and the cathode side of the second diode included in the second switching element so that the sixth diode allows current to flow in the opposite direction from the fourth diode, the anode side of the third diode connected in parallel to the third semiconductor switch is connected to the cathode side of the second diode included in the second switching element, and the anode side of the fourth diode connected in parallel to the fourth semiconductor switch is connected to the cathode side of the first diode included in the first switching element.

11. The DC-DC converter circuit according to claim 9,
wherein the third switching element includes a third semiconductor switch with which current can be controlled on and off in one direction, and a third diode,
the fourth switching element includes a fourth semiconductor switch with which current can be controlled on and off in one direction, and a fourth diode,
the third diode is connected in parallel to the fourth semiconductor switch so that the third diode allows current to flow in the opposite direction from the direction of on and off control by the fourth semiconductor switch,
the fourth diode is connected in parallel to the third semiconductor switch so that the fourth diode allows current to flow in the opposite direction from the direction of on and off control by the third semiconductor switch,
the anode side of the third diode connected in parallel to the fourth semiconductor switch is connected to the cathode side of the first diode included in the first switching element,
the anode side of the fourth diode connected in parallel to the third semiconductor switch is connected to the cathode side of the second diode included in the second switching element, and
the cathode sides of the third diode and the fourth diode are connected.

12. The DC-DC converter circuit according to claim 9,
comprising means for controlling so that the first switching element and the second switching element are not both in an ON state at the same time.

13. The DC-DC converter circuit according to claim 9,
comprising means for controlling so that the first switching element and the fourth switching element are not both in an ON state at the same time.

14. The DC-DC converter circuit according to claim 9,
comprising means for controlling so that the second switching element and the third switching element are not both in an ON state at the same time.

* * * * *